(12) United States Patent
Wiegel et al.

(10) Patent No.: US 12,246,453 B2
(45) Date of Patent: *Mar. 11, 2025

(54) MAPPING INTERFACE FOR MOBILE ROBOTS

(71) Applicant: iRobot Corporation, Bedford, MA (US)

(72) Inventors: Vanessa Wiegel, Needham, MA (US); Stephen O'Dea, Bedford, MA (US); Kathleen Ann Mahoney, Spencerport, NY (US); Qunxi Huang, Somerville, MA (US); Michael Foster, Stoneham, MA (US); Brian Ratta, Burlington, MA (US); Garrett Strobel, Boston, MA (US); Scott Marchant, Saratoga Springs, UT (US)

(73) Assignee: iRobot Corporation, Bedford, MA (US)

( * ) Notice: Subject to any disclaimer, the term of this patent is extended or adjusted under 35 U.S.C. 154(b) by 506 days.

This patent is subject to a terminal disclaimer.

(21) Appl. No.: 17/325,072

(22) Filed: May 19, 2021

(65) Prior Publication Data

US 2021/0268655 A1 Sep. 2, 2021

Related U.S. Application Data

(63) Continuation of application No. 17/308,299, filed on May 5, 2021, which is a continuation of application
(Continued)

(51) Int. Cl.
*G06N 20/00* (2019.01)
*A47L 9/28* (2006.01)
(Continued)

(52) U.S. Cl.
CPC .......... *B25J 9/1666* (2013.01); *A47L 9/2857* (2013.01); *B25J 9/0003* (2013.01); *B25J 9/1697* (2013.01);
(Continued)

(58) Field of Classification Search
CPC ...................................... B25J 9/1666
(Continued)

(56) References Cited

U.S. PATENT DOCUMENTS 8,260,581 B2 9/2012 Hoguet
8,972,052 B2 3/2015 Chiappetta
(Continued)

FOREIGN PATENT DOCUMENTS

CN 102018481 4/2011
CN 102388352 3/2012
(Continued)

OTHER PUBLICATIONS

"Chinese Application Serial No. 201980071229.5, Decision of Rejection mailed Apr. 1, 2022", w English translation, 17 pgs.
(Continued)

*Primary Examiner* — Ruay Ho
(74) *Attorney, Agent, or Firm* — Schwegman Lundberg & Woessner, P.A.

(57) ABSTRACT

A method of operating an autonomous cleaning robot includes presenting, on a display of a handheld computing device, a graphical representation of a map including a plurality of selectable rooms, presenting, on the display, at least one selectable graphical divider representing boundaries of at least one of the plurality of selectable rooms, the at least one selectable graphical divider being adjustable to change at least one of the boundaries of the plurality of selectable rooms, receiving input, at the handheld computing device, representing a selection of an individual selectable
(Continued)

graphical divider, receiving input, at the handheld computing device, representing at least one adjustment to the individual selectable graphical divider, the at least one adjustment including at least one of moving, rotating, or deleting the individual selectable graphical divider, and presenting, on the display, a graphical representation of a map wherein the individual selectable graphical divider is adjusted.

29 Claims, 14 Drawing Sheets

Related U.S. Application Data

No. 16/121,234, filed on Sep. 4, 2018, now Pat. No. 11,007,644.

(51) Int. Cl.
  *B25J 9/00* (2006.01)
  *B25J 9/16* (2006.01)
  *B25J 11/00* (2006.01)
  *B25J 13/00* (2006.01)
  *G01C 21/00* (2006.01)

(52) U.S. Cl.
  CPC ......... *B25J 11/0085* (2013.01); *B25J 13/006* (2013.01); *G01C 21/3856* (2020.08); *G01C 21/3885* (2020.08); *A47L 2201/04* (2013.01)

(58) Field of Classification Search
  USPC ...................................................... 715/716
  See application file for complete search history.

(56) References Cited

U.S. PATENT DOCUMENTS

| | | | |
|---|---|---|---|
| 9,008,835 | B2 | 4/2015 | Dubrovsky et al. |
| 9,019,266 | B2 | 4/2015 | Hoguet |
| 9,396,410 | B1 | 7/2016 | Cervelli et al. |
| 9,456,725 | B2 * | 10/2016 | Kim .................. A47L 9/2847 |
| 9,675,226 | B2 | 6/2017 | Kim et al. |
| 10,488,865 | B2 | 11/2019 | Afrouzi et al. |
| 10,496,262 | B1 | 12/2019 | Ebrahimi Afrouzi et al. |
| 10,695,906 | B2 | 6/2020 | Kim et al. |
| 11,272,823 | B2 | 3/2022 | Orzechowski et al. |
| 2013/0024025 | A1 | 1/2013 | Hsu |
| 2014/0207282 | A1 | 7/2014 | Angle et al. |
| 2017/0031925 | A1 | 2/2017 | Mishra et al. |
| 2017/0265703 | A1 | 9/2017 | Park et al. |
| 2018/0074508 | A1 | 3/2018 | Kleiner et al. |
| 2018/0200888 | A1 * | 7/2018 | Kim .................. A47L 9/2857 |
| 2018/0361577 | A1 * | 12/2018 | Williams ............ A47L 11/4002 |
| 2018/0361585 | A1 * | 12/2018 | Williams ................ A47L 11/14 |
| 2019/0015985 | A1 | 1/2019 | Kim et al. |
| 2019/0061157 | A1 * | 2/2019 | Suvarna ................ G05D 1/0044 |
| 2019/0098446 | A1 * | 3/2019 | Jain ........................ H04W 4/50 |
| 2019/0167059 | A1 * | 6/2019 | Brown ................. G05D 1/0033 |
| 2019/0176321 | A1 | 6/2019 | Afrouzi et al. |
| 2020/0047343 | A1 * | 2/2020 | Bal ....................... G05D 1/0219 |
| 2020/0070345 | A1 | 3/2020 | Wiegel et al. |
| 2021/0252708 | A1 | 8/2021 | Wiegel et al. |

FOREIGN PATENT DOCUMENTS

| | | |
|---|---|---|
| CN | 105142482 | 12/2015 |
| CN | 108140260 | 6/2018 |
| CN | 112955288 A | 6/2021 |
| CN | 112955288 | 11/2022 |
| EP | 3184014 | 6/2017 |
| EP | 3366181 A1 | 8/2018 |
| GB | 2567944 A | 5/2019 |
| JP | 2005321915 | 11/2005 |
| JP | 2012011200 | 1/2012 |
| JP | 2014109877 | 6/2014 |
| JP | 2017119508 | 7/2017 |
| JP | 7326449 | 8/2023 |
| WO | WO-2018053100 A1 | 3/2018 |
| WO | WO-2020050986 A1 | 3/2020 |

OTHER PUBLICATIONS

"European Application Serial No. 19857611.8, Communication Pursuant to Article 94(3) EPC mailed Apr. 19, 2022", 6 pgs.
"U.S. Appl. No. 16/121,234, Examiner Interview Summary mailed Jan. 11, 2021", 3 pgs.
"U.S. Appl. No. 16/121,234, Non Final Office Action mailed Oct. 6, 2020", 14 pgs.
"U.S. Appl. No. 16/121,234, Notice of Allowance mailed Apr. 5, 2021", 5 pgs.
"U.S. Appl. No. 16/121,234, Response filed Jan. 6, 2021 to Non Final Office Action mailed Oct. 6, 2020", 12 pgs.
"International Application Serial No. PCT/US2019/047647, International Search Report mailed Nov. 7, 2019", 2 pgs.
"International Application Serial No. PCT/US2019/047647, Written Opinion mailed Nov. 7, 2019", 5 pgs.
"Neato All-Floor Robotic Vacuum User's Guide", Neato Robotics, Inc., (2011), 174 pgs.
"European Application Serial No. 19857611.8, Extended European Search Report mailed Apr. 4, 2022", 4 pgs.
"Chinese Application Serial No. 201980071229.5, Response filed Mar. 18, 2022 to Office Action mailed Nov. 5, 2021", w English Claims, 10 pgs.
"Chinese Application Serial No. 201980071229.5, Office Action mailed Nov. 5, 2021", w English Translation, 21 pgs.
"Japanese Application Serial No. 2021-537029, Response filed Oct. 26, 2022 to Notification of Reasons for Refusal mailed May 9, 2022", w English Claims, 17 pgs.
"Japanese Application Serial No. 2021-537029, Notification of Reasons for Refusal mailed Jan. 16, 2023", w English Translation, 16 pgs.
"Japanese Application Serial No. 2021-537029, Response filed Apr. 11, 2023 to Notification of Reasons for Refusal mailed Jan. 16, 2023", w English Claims, 10 pgs.
"European Application Serial No. 19857611.8, Response May 5, 2023 to Communication Pursuant to Article 94(3) EPC mailed Oct. 28, 2022", 15 pgs.
"European Application Serial No. 19857611.8, Response filed Oct. 13, 2021 to Communication pursuant to Rules 161(2) and 162 EPC mailed Oct. 13, 2021", 13 pgs.
"Chinese Application Serial No. 201980071229.5, Response Filed Jul. 16, 2022 Decision of Rejection mailed Apr. 1, 2022", W English Claims, 28 pgs.
"European Application Serial No. 19857611.8, Response Filed Aug. 26, 2022 Communication Pursuant to Article 94(3) EPC mailed Apr. 19, 2022", 13 pgs.
"European Application Serial No. 19857611.8, Communication Pursuant to Article 94(3) EPC mailed Jun. 29, 2023", 7 pgs.
"European Application Serial No. 19857611.8, Communication Pursuant to Article 94(3) EPC mailed Oct. 28, 2022", 7 pgs.
"Japanese Application Serial No. 2021-537029, Notification of Reasons for Refusal mailed May 9, 2022", w English translation, 13 pgs.
"U.S. Appl. No. 17/308,299, Examiner Interview Summary mailed Feb. 7, 2024", 2 pgs.
"U.S. Appl. No. 17/308,299, Non Final Office Action mailed Dec. 13, 2023", 15 pgs.
"European Application Serial No. 19857611.8, Response filed Oct. 25, 2023 to Communication Pursuant to Article 94(3) EPC mailed Jun. 29, 2023", 32 pgs.
"U.S. Appl. No. 17/308,299, Response filed Feb. 26, 2024 to Non Final Office Action mailed Dec. 13, 2023", 11 pgs.
"U.S. Appl. No. 17/308,299, Non Final Office Action mailed Sep. 6, 2024", 14 pgs.
"U.S. Appl. No. 17/308,299, Examiner Interview Summary mailed Dec. 2, 2024", 2 pgs.

(56) References Cited

OTHER PUBLICATIONS

"U.S. Appl. No. 17/308,299, Response filed Dec. 2, 2024 to Non Final Office Action mailed Sep. 6, 2024", 11 pgs.

* cited by examiner

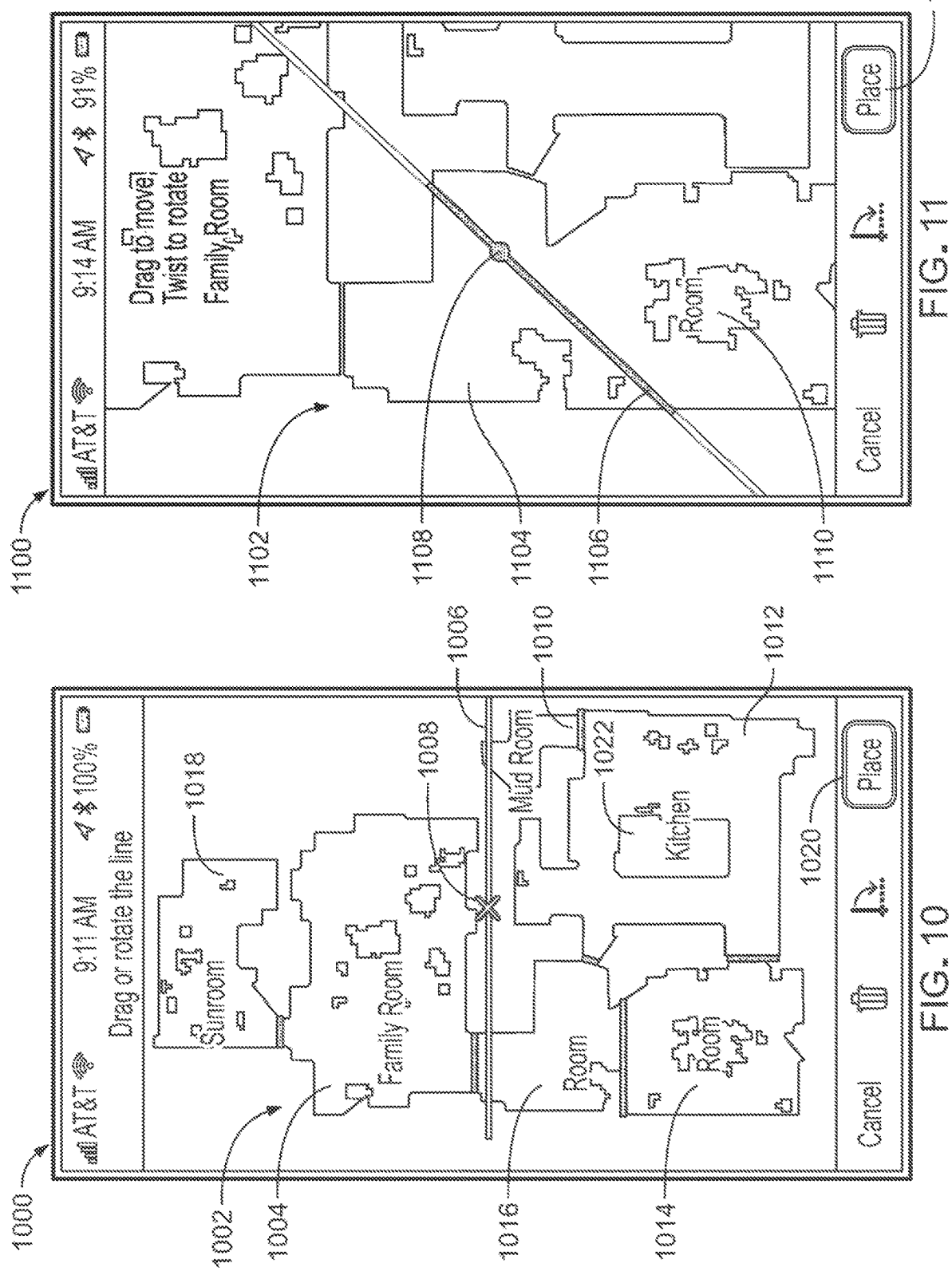

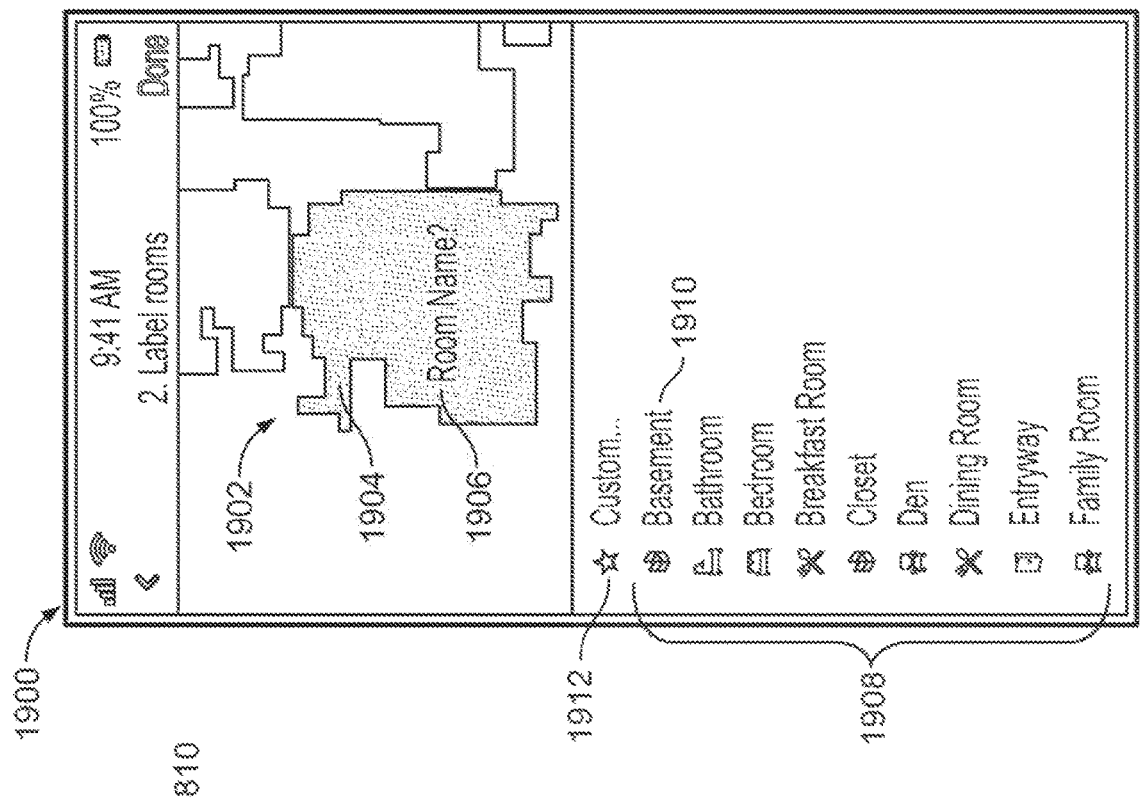

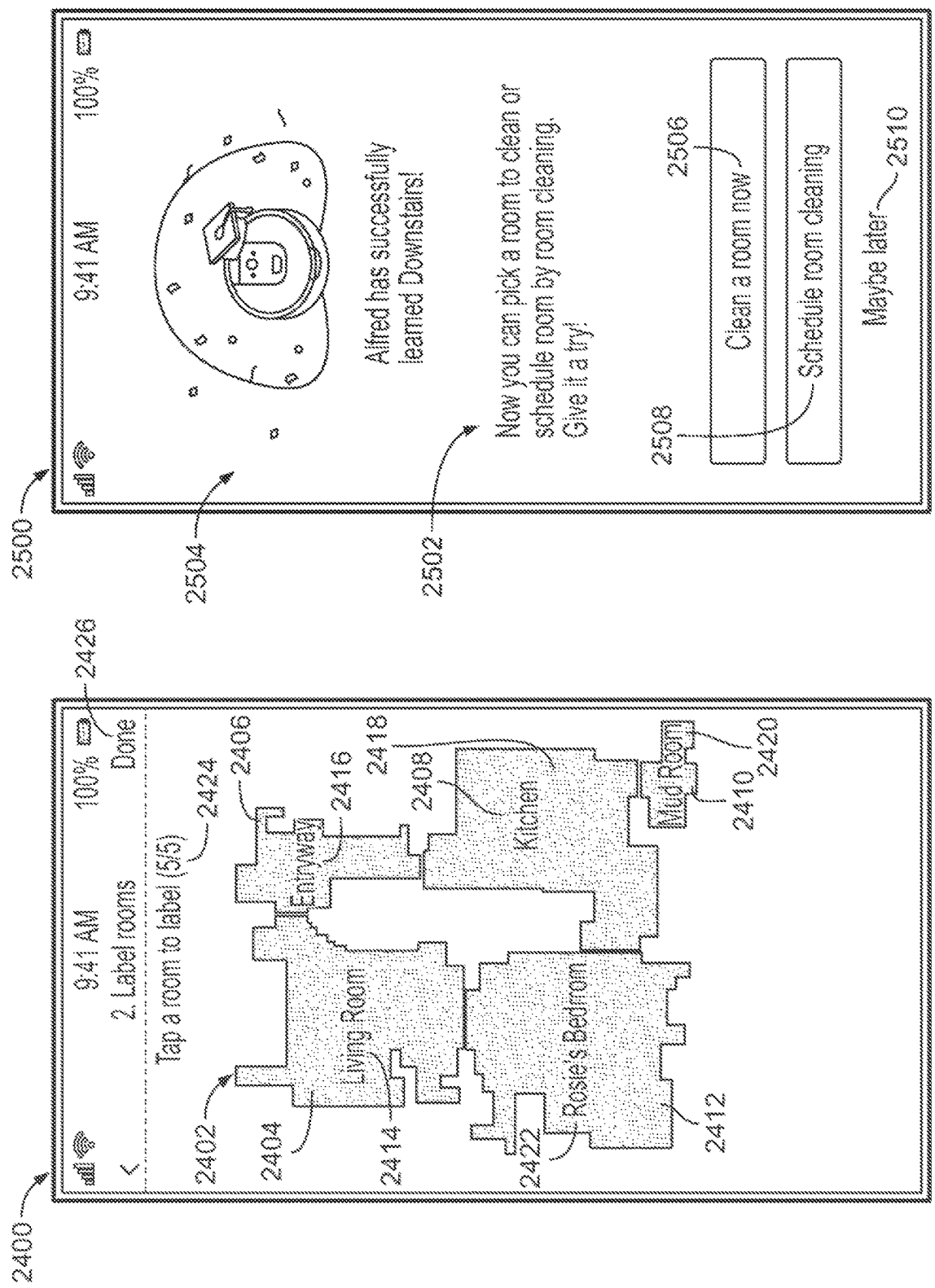

MAPPING INTERFACE FOR MOBILE ROBOTS

TECHNICAL FIELD

This specification relates generally to control systems for autonomous cleaning robots. In one exemplary system, selectable and editable maps are used for controlling an autonomous cleaning robot.

BACKGROUND

Cleaning robots include mobile robots that autonomously perform cleaning tasks within an environment, e.g., a home. Many kinds of cleaning robots are autonomous to some degree and in different ways. The cleaning robots include a controller that is configured to autonomously navigate the cleaning robot about the environment such that the cleaning robot can ingest debris as it moves.

SUMMARY

A mobile application can be used to present a map displaying areas traversed by an autonomous cleaning robot during cleaning missions and may allow editing room boundaries on the map. A master map is generated from data collected by the autonomous cleaning robot traversing an area (e.g., a series of rooms). The master map is editable and allows a user to customize (e.g., label, resize, reshape, etc.) particular rooms displayed on the master map. Selectable graphical dividers are positionable and allow the user to define boundaries between rooms on the master map (e.g., to restrict future operations of the autonomous cleaning robot). Labels can be applied to rooms on the master map and can be compiled into a list from which a user can individually select rooms, floors, etc. for inclusion in a cleaning mission for the autonomous cleaning robot.

Described herein are examples of methods and devices for training and using mobile robots configured to traverse floor surfaces and perform various operations including, but not limited to, cleaning. Advantages of the foregoing may include, but are not limited to, those described below and herein elsewhere.

The generation of a custom map allows a user to perform on-demand cleaning of particular areas (e.g., rooms, floors) of the user's home. For example, the user may direct the autonomous cleaning robot to clean the entire downstairs or just the master bedroom. On-demand cleaning is especially useful, for example, if the user is having guests over to his/her home and needs the kitchen, living room, and bathroom cleaned before guests arrive, as the user may select just those rooms for cleaning.

In one aspect, the present specification provides a method of operating an autonomous cleaning robot. The method includes presenting, on a display of a handheld computing device, a graphical representation of a map including a plurality of selectable rooms. The method also includes presenting, on the display, at least one selectable graphical divider representing boundaries of at least one of the plurality of selectable rooms, the at least one selectable graphical divider being adjustable to change at least one of the boundaries of the plurality of selectable rooms. The method also includes receiving input, at the handheld computing device, representing a selection of an individual selectable graphical divider. The method also includes receiving input, at the handheld computing device, representing at least one adjustment to the individual selectable graphical divider, the at least one adjustment including at least one of moving, rotating, or deleting the individual selectable graphical divider and presenting, on the display, a graphical representation of a map wherein the individual selectable graphical divider is adjusted.

In some implementations, the method also includes receiving input, at the handheld computing device, to initiate the autonomous cleaning robot to perform a cleaning mission, wherein the autonomous cleaning robot is configured to clean based on the graphical representation of the map wherein the individual selectable graphical divider is adjusted.

In some implementations, the method also includes presenting, on the display, a visual alert upon receiving input to position a center point of the individual selectable graphical divider outside of a room. In some instances, presenting the visual alert includes changing a color of the individual selectable graphical divider or a shape of the center point.

In some implementations, the method also includes presenting, on the display, in at least one of the plurality of selectable rooms, a representation of an open area and a representation of an area containing one or more moveable objects.

In some implementations, a center point of the individual selectable graphical divider is positionable in a room, in an open area, or in an area containing at least one moveable object.

In some implementations, the method also includes presenting, on the display, a representation of an immovable object in a room, wherein the individual selectable graphical divider accounts for a position of the immovable object to divide the room. In some instances, the method also includes presenting a visual alert upon a center point of the individual selectable graphical divider being placed on the representation of the immovable obstacle.

In some implementations, the method also includes presenting, on the display, a list of selectable room labels for naming a selected room.

In some implementations, the method also includes presenting, on the display, an interface for entering a custom name for naming a selected room.

In some implementations, the individual selectable graphical divider is configured to snap to an angular increment based on rotating the individual selectable graphical divider. In some instances, the angular increment is 45 degrees.

In some implementations, the method also includes receiving input, at the handheld computing device, representing an addition of a new selectable graphical divider and presenting, on the graphical representation of the map on the display, the new selectable graphical divider.

In some implementations, the method also includes presenting, on the display, a menu including options to rename the map, edit the map, or rename selectable rooms on the map.

In another aspect, the present specification provides a handheld computing device. The handheld computing device includes at least one input configured to receive information from a user, a display, and a processor. The processor is configured to present, on the display, a graphical representation of a map including a plurality of selectable rooms. The processor is also configured to present, on the display, at least one selectable graphical divider representing boundaries of the selectable rooms, the at least one selectable graphical divider being individually adjustable to change at least one of the boundaries of the selectable rooms. The processor is also configured to present, on the display, a graphical representation of a map wherein an individual selectable graphical divider is adjusted. The received information includes a selection of the individual selectable graphical divider, and the received information includes at least one adjustment to the individual selectable graphical divider, the at least one adjustment including at least one of moving, rotating, and deleting the individual selectable graphical divider.

In some implementations, the received information includes information to initiate the autonomous cleaning robot to perform a cleaning mission, and the autonomous cleaning robot is configured to clean based on the graphical representation of the map wherein the individual selectable graphical divider is adjusted.

In some implementations, the processor is further configured to present, on the display, a visual alert upon receiving input to position a center point of the individual selectable graphical divider outside of a room. In some instances, presenting the visual alert includes changing a color of the individual selectable graphical divider and a shape of the center point.

In some implementations, the processor is further configured to present, on the display, in at least one of the plurality of selectable rooms, a representation of an open area and a representation of an area containing at least one moveable object.

In some implementations, a center point of the individual selectable graphical divider is positionable in a room, in an open area, or in an area containing at least one moveable object.

In some implementations, the processor is further configured to present, on the display, a representation of an immovable object in a room, wherein the individual selectable graphical divider accounts for a position of the immovable object to divide the room. In some instances, the processor is further configured to present, on the display, a visual alert upon the center point of the individual selectable graphical divider being placed on the representation of the immovable obstacle.

In some implementations, the processor is further configured to present, on the display, a list of selectable room labels for naming a selected room.

In some implementations, the processor is further configured to present, on the display, an interface for entering a custom name for naming a selected room.

In some implementations, the selectable graphical divider is configured to snap to an angular increment based on rotating the individual selectable graphical divider. In some instances, the angular increment is 45 degrees.

In some implementations, the input is configured to receive information representing an addition of a new selectable graphical divider, and the processor is configured to present, on the graphical representation of the map on the display, the new selectable graphical divider.

In some implementations, the processor is further configured to present, on the display, a menu includes options to rename the map, edit the map, or rename selectable rooms on the map.

The details of one or more implementations are set forth in the accompanying drawings and the description below. Other features and advantages will be apparent from the description and drawings, and from the claims.

BRIEF DESCRIPTION OF DRAWINGS

FIGS. 9-14 are interfaces showing a map during a process of positioning selectable graphical dividers.

FIGS. 15-22 are interfaces presented during a process of labelling rooms on a map.

FIG. 24 is an interface showing a map on where the rooms have been labelled.

FIG. 25 is an interface showing a map completion confirmation and that cleaning operations may be initiated.

DETAILED DESCRIPTION

An application can be used to control operation of an autonomous cleaning robot for cleaning missions. A master map is generated based on the autonomous cleaning robot traversing an area. For example, a master map can be considered a digital representation of the traversable flooring area of an environment (e.g., a residence) that has been generated from data collected by the autonomous cleaning robot over a single cleaning session, a series of cleaning sessions, a training mission, a series of training missions, etc. During a cleaning mission, the autonomous cleaning robot performs cleaning tasks as the autonomous cleaning robot traverses the environment. During a training mission, the autonomous cleaning robot does not perform cleaning tasks (or performs limited cleaning tasks) as the autonomous cleaning robot traverses the environment. The master map is editable and allows a user to customize (e.g., label, resize, reshape, etc.) particular rooms displayed on the master map. Selectable graphical dividers are positionable and allow a user to define boundaries between rooms on the master map. Labels can be applied to rooms on the master map and can be compiled into a list from which a user can select rooms, floors, etc. floors for inclusion in a cleaning mission for the autonomous cleaning robot. In some examples, through the mobile application, the user can manage operations for the autonomous cleaning robot (e.g., select cleaning parameters, schedule the autonomous cleaning robot, view a cleaning status of the autonomous cleaning robot, etc.).

Figure 1:
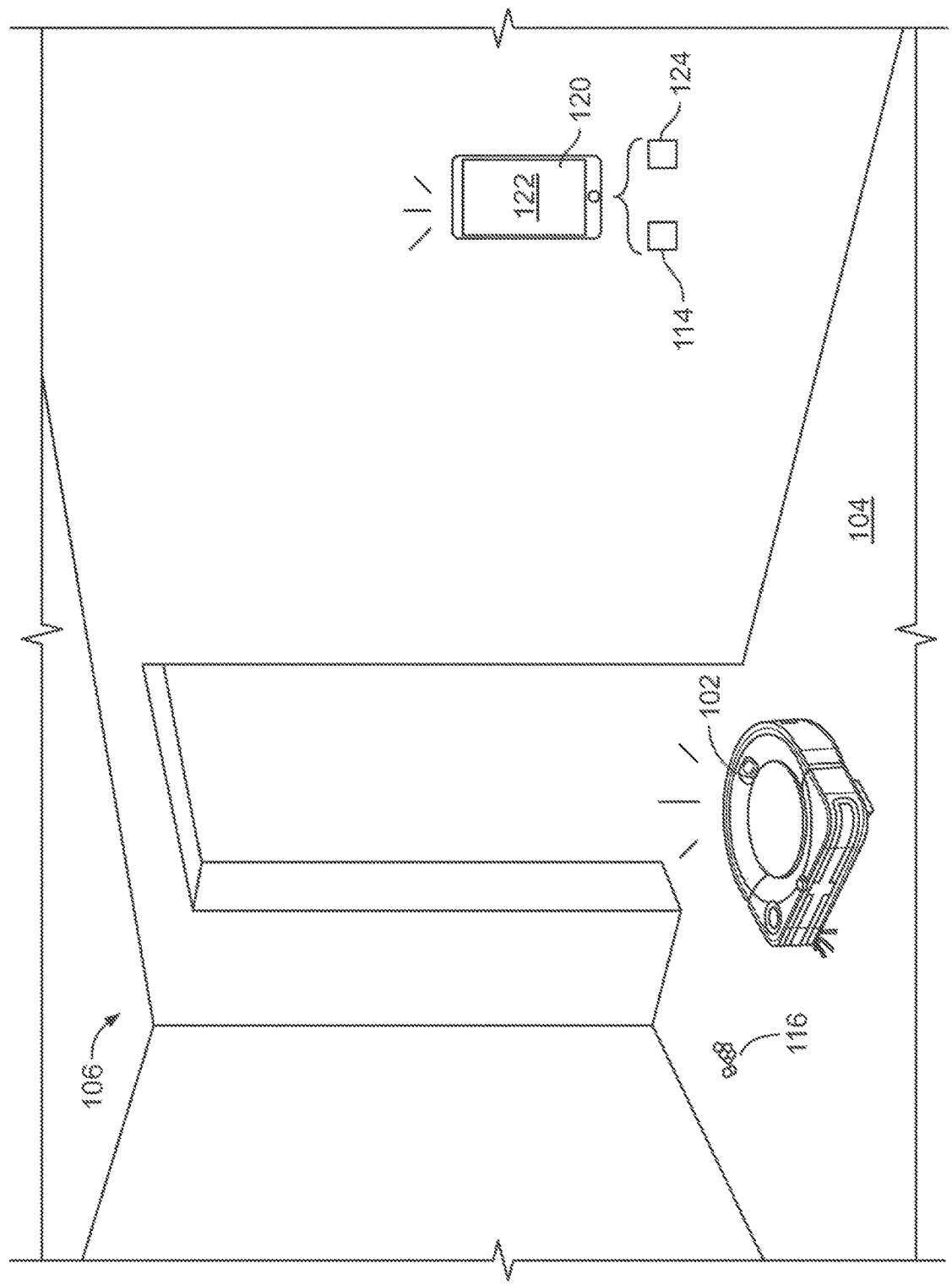
FIG. 1 illustrates an environment including an autonomous cleaning robot and a handheld computing device.

Referring to FIG. 1, an autonomous cleaning robot 102 is located on a floor surface 104 within a room 106. The autonomous cleaning robot 102 is configured to communicate with a mobile device 120. A mobile device 120 as described herein may include a smart phone, a cellular phone, personal digital assistant, laptop computer, tablet, smart watch, or other portable (e.g., handheld) computing device capable of transmitting and receiving signals related to a robot cleaning mission. The mobile device 120 is configured to present, on a display 122, information relating to a robot training run, cleaning mission, etc. and receive an input from a user. The mobile device 120 includes a processor 114 configured to initiate data transmission and reception (via the internet, etc.) with the autonomous cleaning robot 102 and run a mobile application 124 configured to present graphical maps, on the display 122 of the mobile device 120, generated from data collected by the autonomous cleaning robot 102. The maps presented on the display 122 of the mobile device 120 also include an editable master map.

Overall, FIGS. 2-25 illustrate various types of information that can be presented, edited, etc. on the display 122 of the mobile device 120. By presenting this information and allowing the user to edit the information, a custom map can be generated. Based on the custom map, the user may select rooms for inclusion in a cleaning mission.

Figure 2:
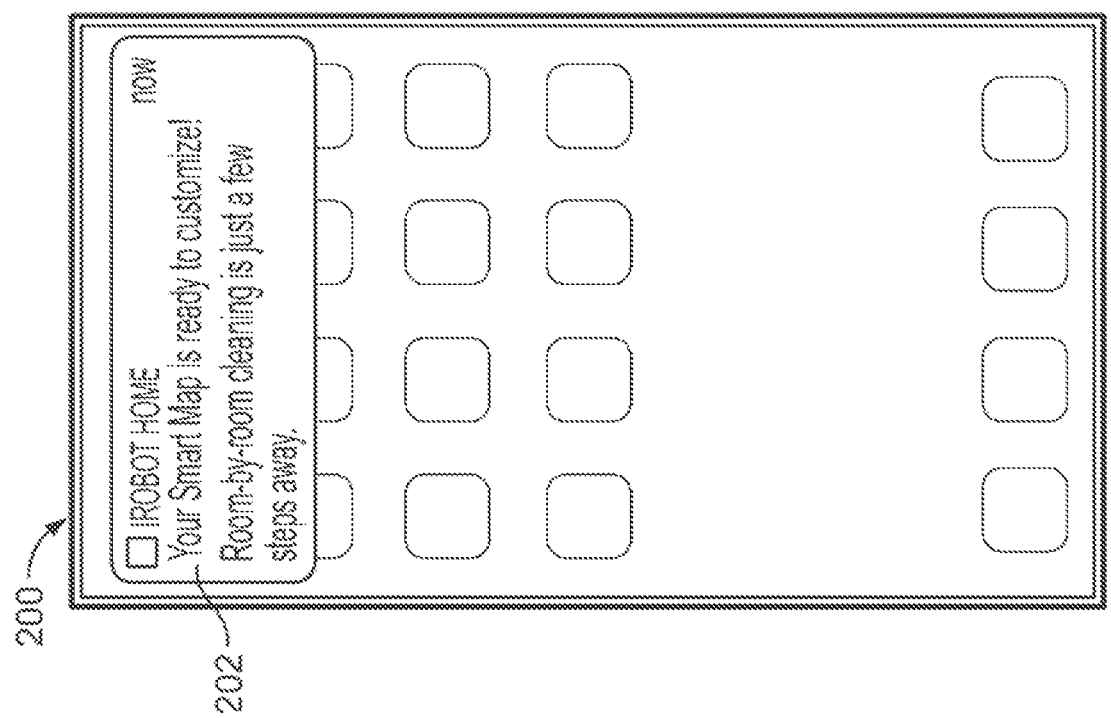
FIG. 2 is an interface showing a notification that a map is ready for editing.

FIG. 2 is an interface 200 presented on the display 122 of the mobile device 120. The interface 200 includes a push notification 202 indicating that a master map is ready to be edited by the user. Selecting the push notification 202 opens the mobile application 124 configured to allow the user to edit the master map. Editing the master map allows the user to create a custom map configured to allow the user to set up room-by-room cleaning or other types of cleaning-related functions.

Figure 3:
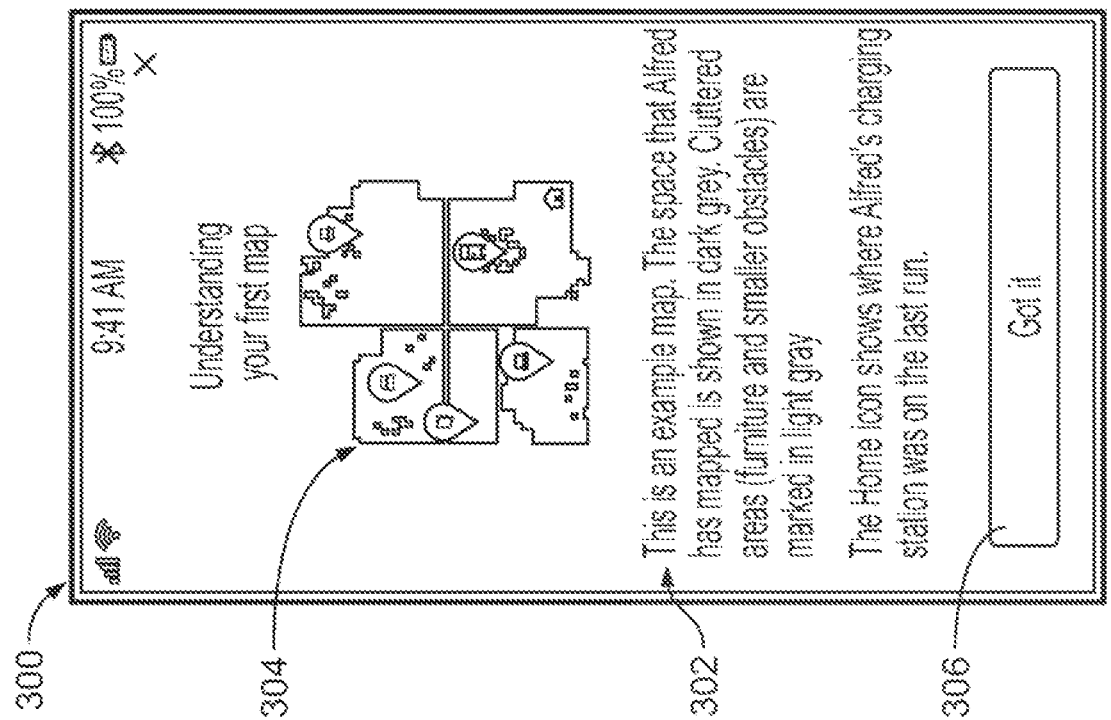
FIG. 3 is an interface that describes portions of a generated map.

Referring to FIG. 3, an interface 300, presented on the display 122 of the mobile device 120, shows a text instruction 302 to aid a user in understanding the master map that will be presented for editing in the mobile application 124 (e.g., displayed symbol meaning, color scheme meaning, etc.). The interface 300 also includes a schematic 304 of a sample master map. The schematic 304 includes information informing the user that the master map will contain markings representing various types of information associated with the map. For example, graphical elements may represent locations of moveable objects ("cluttered areas"). A selectable button 306 is presented to allow the user to close the interface 300 and move on to presenting the next interface.

Figure 4:
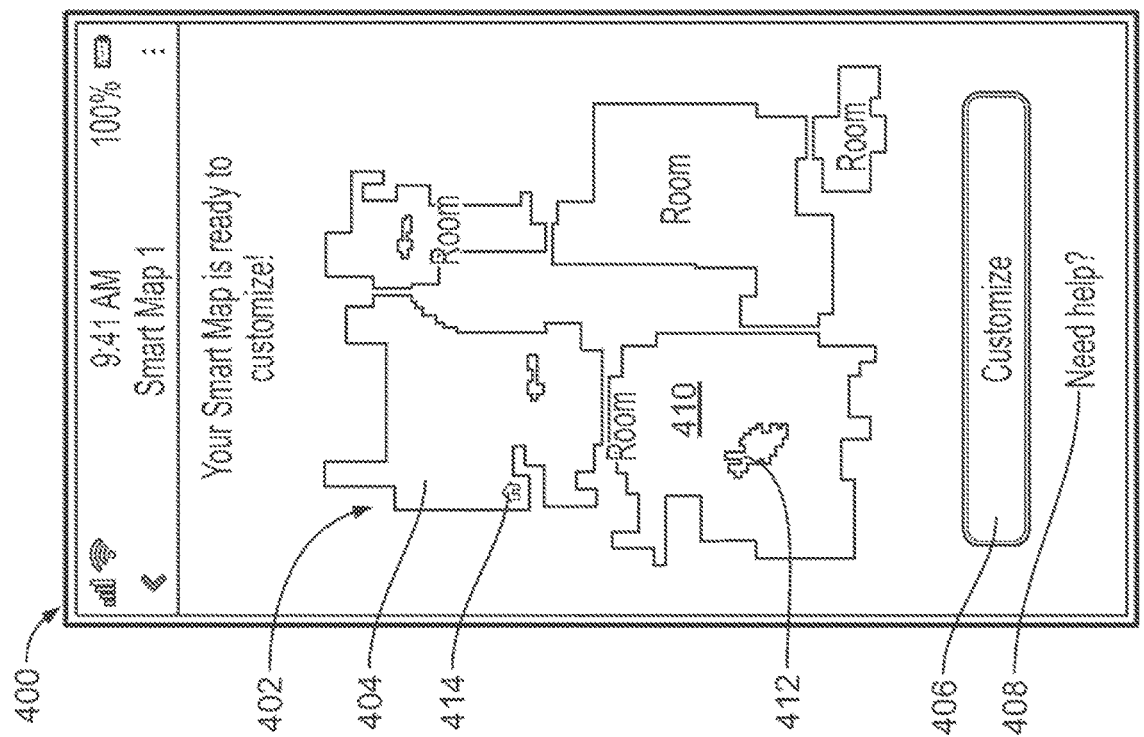
FIG. 4. is an interface showing a map configured to be customized.

Referring to FIG. 4, an interface 400, presented on the display 122 of the mobile device 120, presents a master map 402 that is editable by the user. The master map 402 includes a room 404 within which a docking station is located (shown by icon 414) for charging the autonomous cleaning robot 102. The room 404 may also include representations of open areas 410, as shown by the dark grey shading, and areas that include moveable objects 412, as shown by the light grey shading, etc. Areas including moveable objects 412 may be, for example, areas where objects, due to their size, shape, function, etc., may be frequently moved. For example, an area where a table and chairs are positioned may be represented as an area including moveable objects 412 as the table and chairs may shift positions (due to their use) between missions where the table and chairs were detected by the autonomous cleaning robot 102. Open areas 410 are areas where the autonomous cleaning robot has not detected obstacles on a consistent basis as the autonomous cleaning robot traversed the room 404. To begin customizing the map 402, the user selects customize button 406. If the user desires further instructions for customizing the map 402, the user can press a help button 408.

Figure 5:
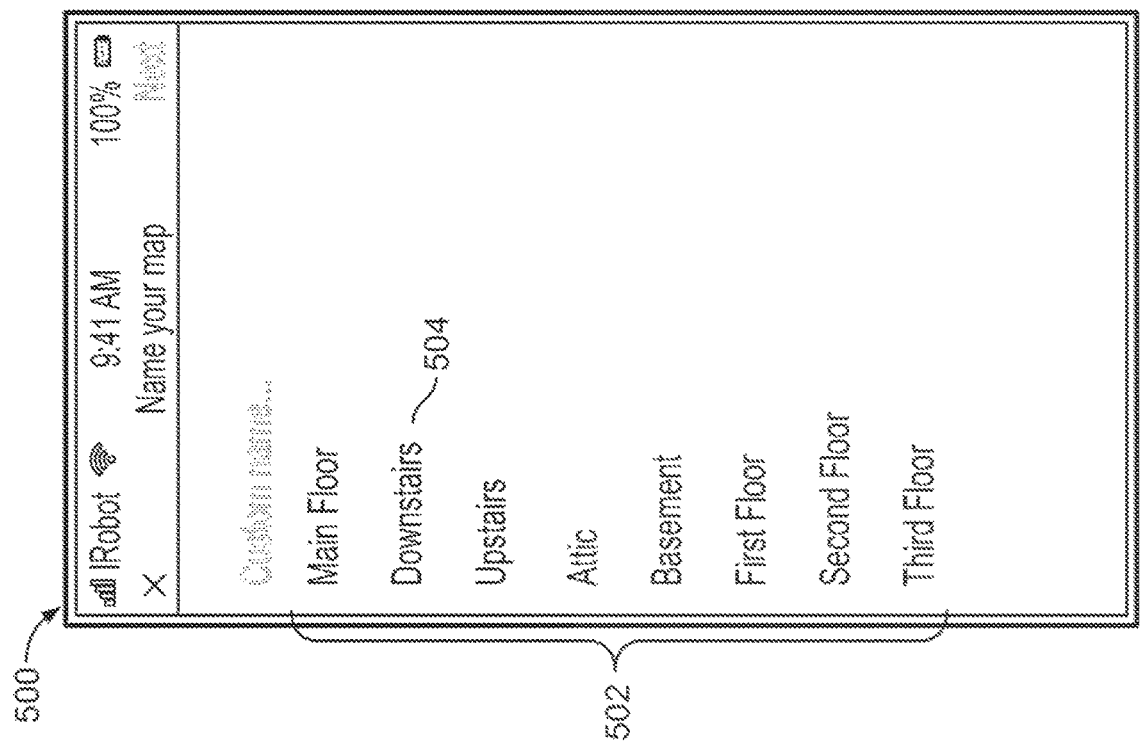
FIG. 5 and FIG. 6 are interfaces for naming the map shown in FIG. 4.
Figure 6:
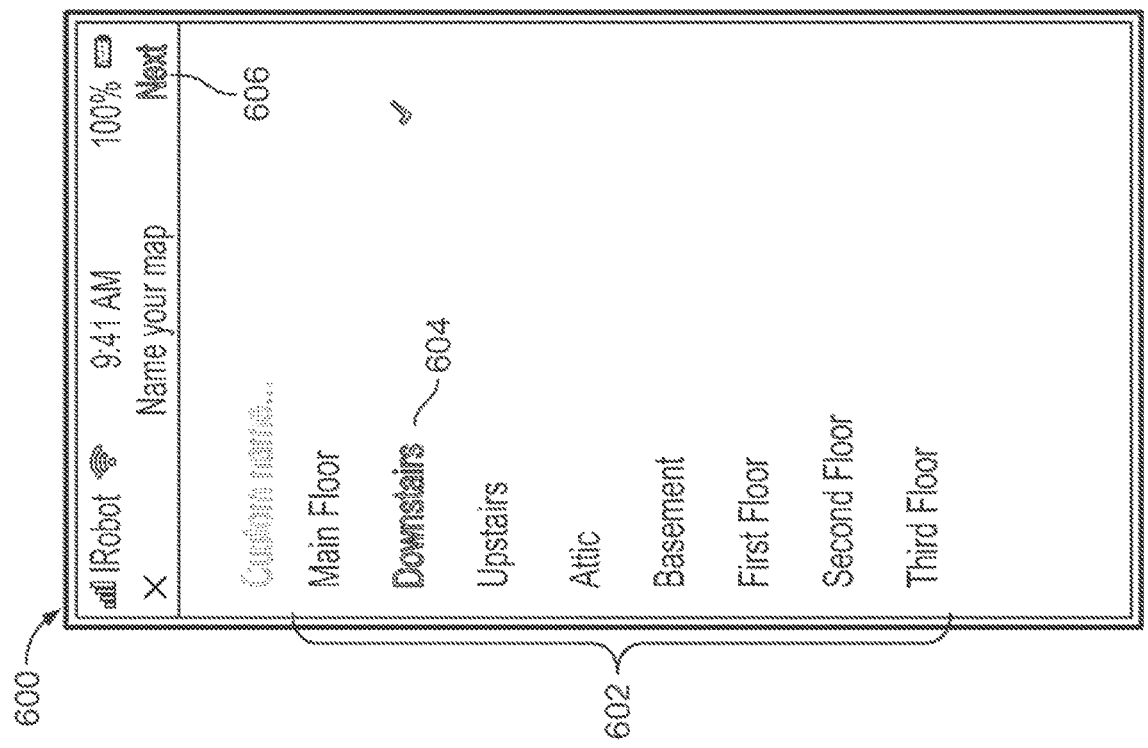

When the user selects the customize button 406, the mobile device 120 presents interface 500, as shown in FIG. 5, to begin customization. The user can name the master map 402 by entering a custom name in the custom name field 506 or selecting from a list 502 of preset names. The preset name list 502 includes common names for rooms or floor levels of homes (e.g., "Downstairs" label 504). As shown in FIG. 6, selecting a "Downstairs" label 604, changes the color of the label 604 to indicate that the label 604 has been selected. After a name has been selected or entered, the user selects a continue button 606.

Figure 7:
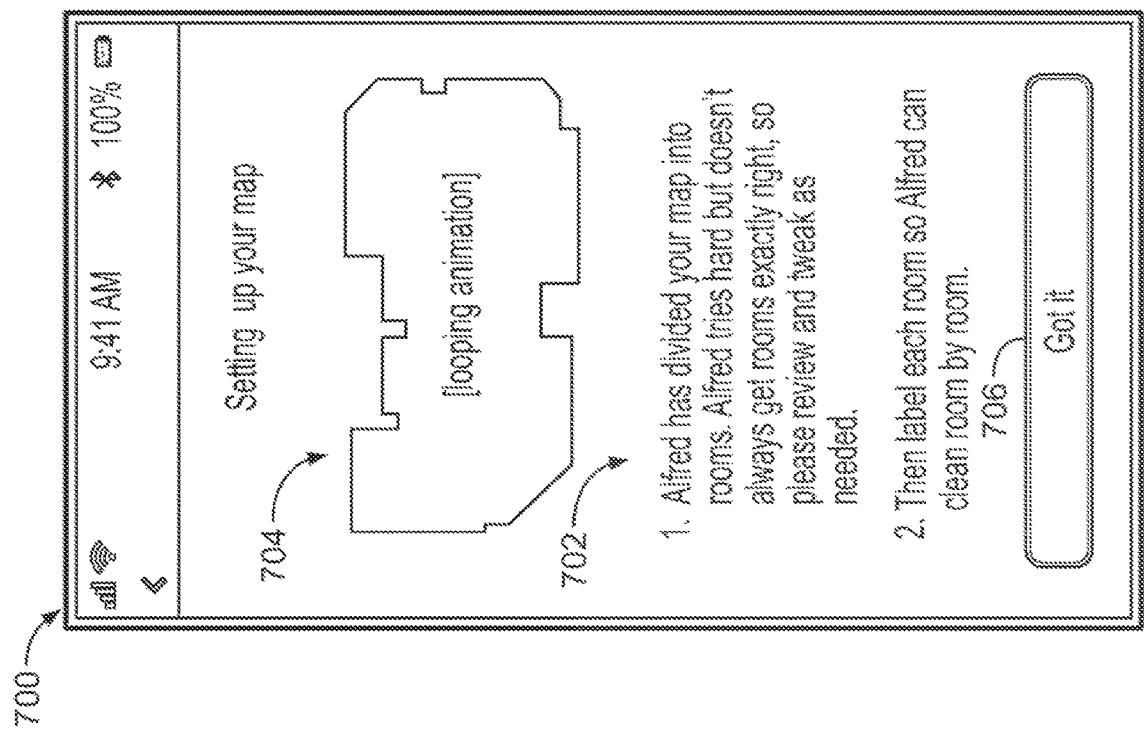
FIG. 7 is an interface showing instructions for editing the map.

Referring to FIG. 7, after the user has named the map 402 (shown in FIG. 4), the mobile device 120 presents an interface 700, on the display 122, providing text instructions 702 and an animation 704 for instructing the user how to divide the map 402 into rooms. The text instructions 702 and the animation 704 inform the user that the mobile application 124, prior to allowing the user to customize the map 402, divides the map 402 into a set of rooms. The map 402 is divided into a set of rooms based on information obtained from the autonomous cleaning robot 102 (e.g., based on a general shape and size, the autonomous cleaning robot 102 and/or the mobile application 124 may define one or more rooms). In some instances, sensor data (e.g., accelerometer data, bump sensor data, cliff sensor data, etc.) from the autonomous cleaning robot 102 may be used to divide the map 402 into a set of rooms. After reviewing the instructions on the interface 700, the user selects a continue button 706 to begin customizing the map 402.

Figure 8:
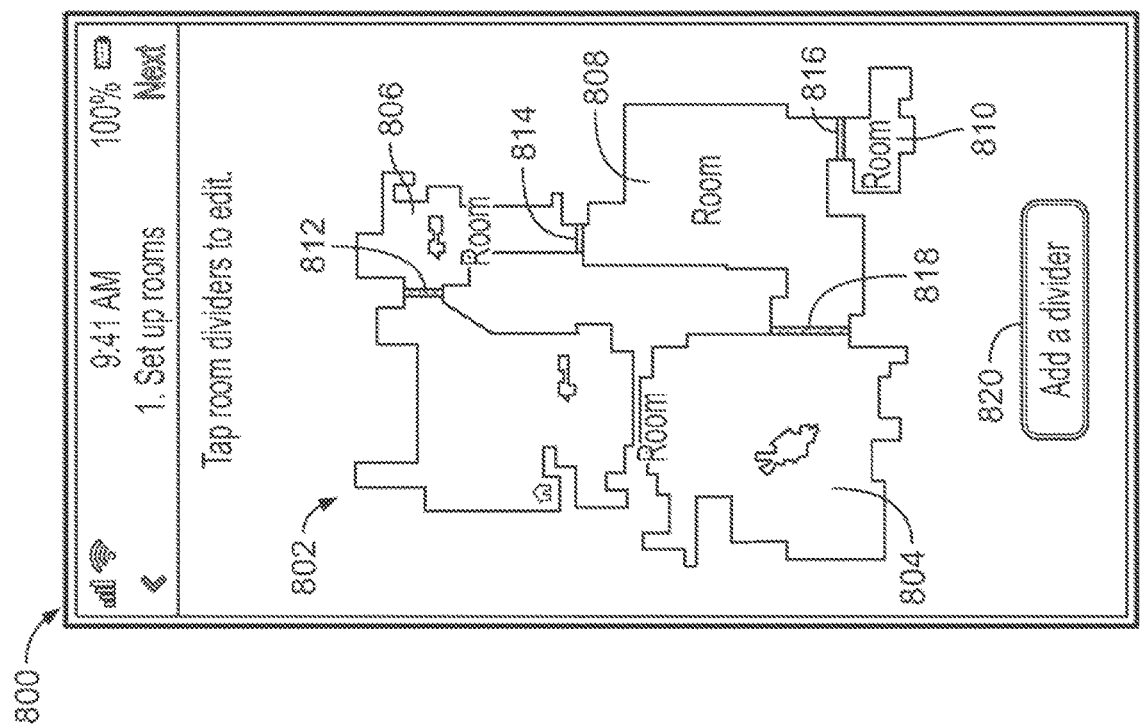
FIG. 8 is an interface showing a map including selectable graphical dividers.

Referring to FIG. 8, the mobile device presents an interface 800 that allows the user to customize a master map 802 (a new representation of the map 402 shown in FIG. 4) on a room by room basis. The master map 802 includes rooms 804, 806, 808, 810 that are separated from one another by selectable graphical dividers 812, 814, 816, 818. The selectable graphical dividers 812, 814, 816, 818 are positioned on the master map 802 at positions determined based on data gathered by the autonomous cleaning robot. The interface 800 also presents an add divider button 820 that allows a user to create and add a new selectable graphical divider to the map 802. When a user selects this button, an interface 900 is presented for controlling the placement, orientation, etc. of the new selectable graphical divider.

Figure 9:
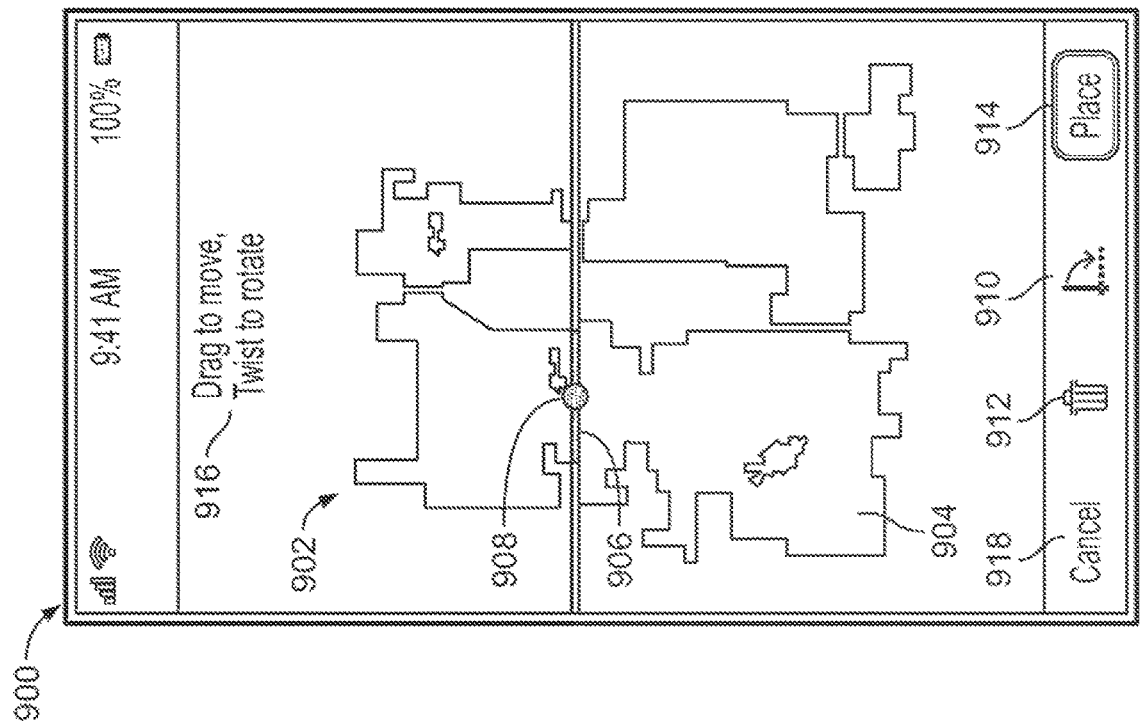

Referring to FIG. 9, the interface 900 presents a map 902 (another new representation of the map 402 shown in FIG. 4) that includes a new selectable graphical divider 906 (created by selecting the add divider button 820 shown in FIG. 8). The selectable graphical divider 906 includes a center point 908. The center point 908 is positioned in a room 904 and indicates to the user, along with instruction text 916, that the selectable graphical divider 906 can be moved, rotated, etc. The center point 908 of the selectable graphical divider 906 is located at a midpoint of a portion of the selectable graphical divider 906 located within the room containing the center point 908. The portions of the selectable graphical divider 906 that extend beyond the room containing the center point 908 may be represented differently (e.g., fade in color, change in color, change in transparency, etc.).

When the center point 908 is positioned in a room 904 on the map 902, the selectable graphical divider is shown to divide a room 904. When a user is satisfied that the selectable graphical divider 906 is positioned in a desired position on the map 902, the user presses a button 914 labeled "place". To delete the selectable graphical divider 906, the user presses a delete button 912. In some implementations, the user may drag the center point 908 of the selectable graphical divider 906 to the delete button 912. To cancel a previously executed operation, the user presses cancel button 918. The selectable graphical divider 906 can be snapped to an angular increment, for example a closest angular increment in increments of 45 degrees, by pressing the snap button 910. An example of snapping is shown in FIG. 11.

Referring to FIG. 10, an interface 1000 shows an instance where a center point 1008 of a selectable graphical divider 1006 is positioned outside of rooms 1004, 1010, 1012, 1014, 1016, 1018, on a map 1002. Generally, for the mobile application 124 to understand which room the selectable graphical divider 906 is meant to divide, the center point 908 must be located within a room 1004, 1010, 1012, 1014, 1016, 1018 on the map 1002. When positioned outside of all rooms 1004, 1010, 1012, 1014, 1016, 1018, on the map 1002, the center point 1008 changes shape (e.g., from a circle to an "X" shape, etc.) to raise a visual alert to the user. The visual alert indicates that the selectable graphical divider 1006 has been positioned outside of the rooms 1004, 1010, 1012, 1014, 1016, 1018 and that corrective action is required. In some instances, a place button 1020 may be unselectable (e.g., greyed out, etc.) to indicate that the selectable graphical divider 1006 is improperly positioned. In some instances, the interface 100) may not allow the selectable graphical divider 1006 to be placed in an improper position (e.g., outside of the rooms 1004, 1010, 1012, 1014, 1016, 1018 on the map 1002) and may snap the center point 1008 to a closest position within a room on the map 10012.

An immovable object 1022 is positioned on the map 1002 in the kitchen, room 1012. Immovable objects may be, for example, kitchen islands, permanent pieces of furniture, etc. that are positioned in a room. When the user attempts to place the center point 1008 of the selectable graphical divider 1006 on the immovable object 1022, the center point 1008 will change to provide a visual alert to the user that the selectable graphical divider is improperly placed. In some implementations, the mobile application 124 treats an immovable object as creating a boundary of a room, rather than recognizing the immovable object as being within a room. In such an implementation, outer edges of immovable object 1022 would be defined as boundaries of the kitchen 1012 such that the kitchen included a void. In some implementations, the mobile application 124 may account for a position of an immovable object 1022 when the immovable object 1022 is intersected with the selectable graphical divider 1006. When the center point 1008 is positioned in the kitchen 1012 such that the selectable graphical divider 1006 extends across the immovable object 1022, portions of the selectable graphical divider 1006 that cross the immovable object 1022 may be shown differently, or may be absent.

FIG. 11 is an interface 1100 including a selectable graphical divider 1106 that is rotated about a center point 1108 placed in a room 1104 on a map 1102. The room includes an area including moveable objects 1110. A user may place the center point 1108 of the selectable graphical divider 1106 over the area including moveable objects 1110. As the selectable graphical divider 1106 rotates about the center point 1108, the selectable graphical divider snaps to a closest angular increment when the user lets go of the selectable graphical divider 1106. In some instances, the angular increments are 45 degrees. When the user decides that the selectable graphical divider 1106 is positioned as desired, the user presses a place button 1112 to save the position of the selectable graphical divider 1106.

Figure 13:
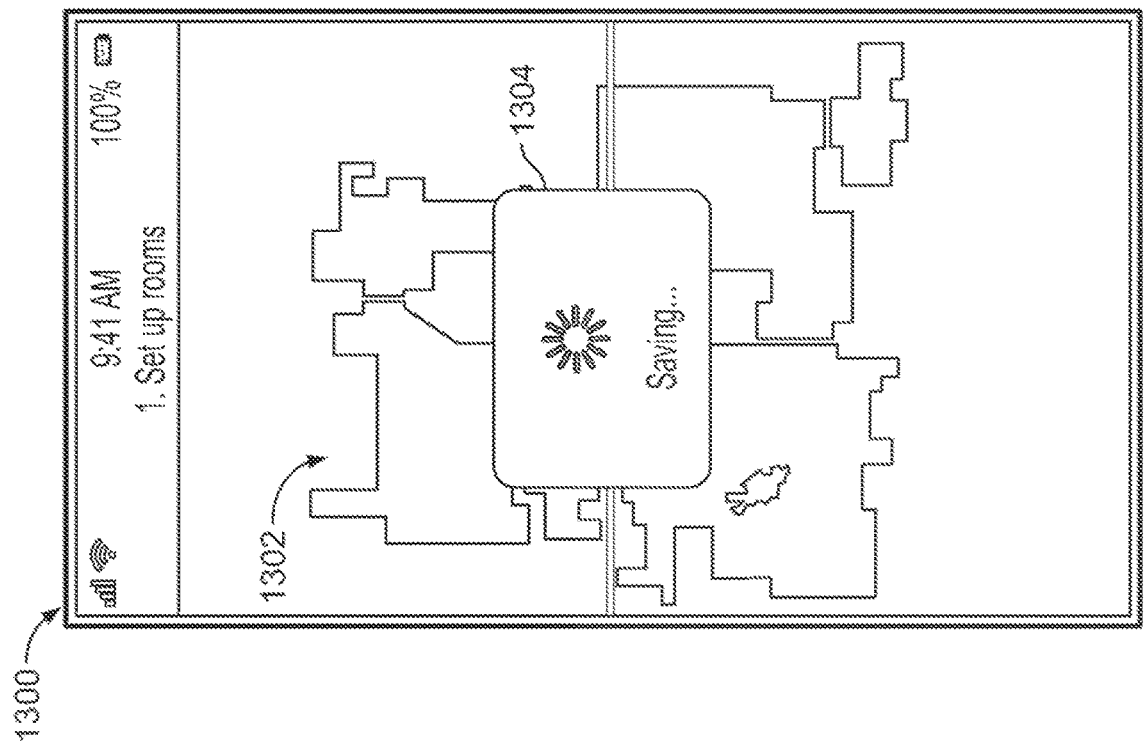
Figure 12:
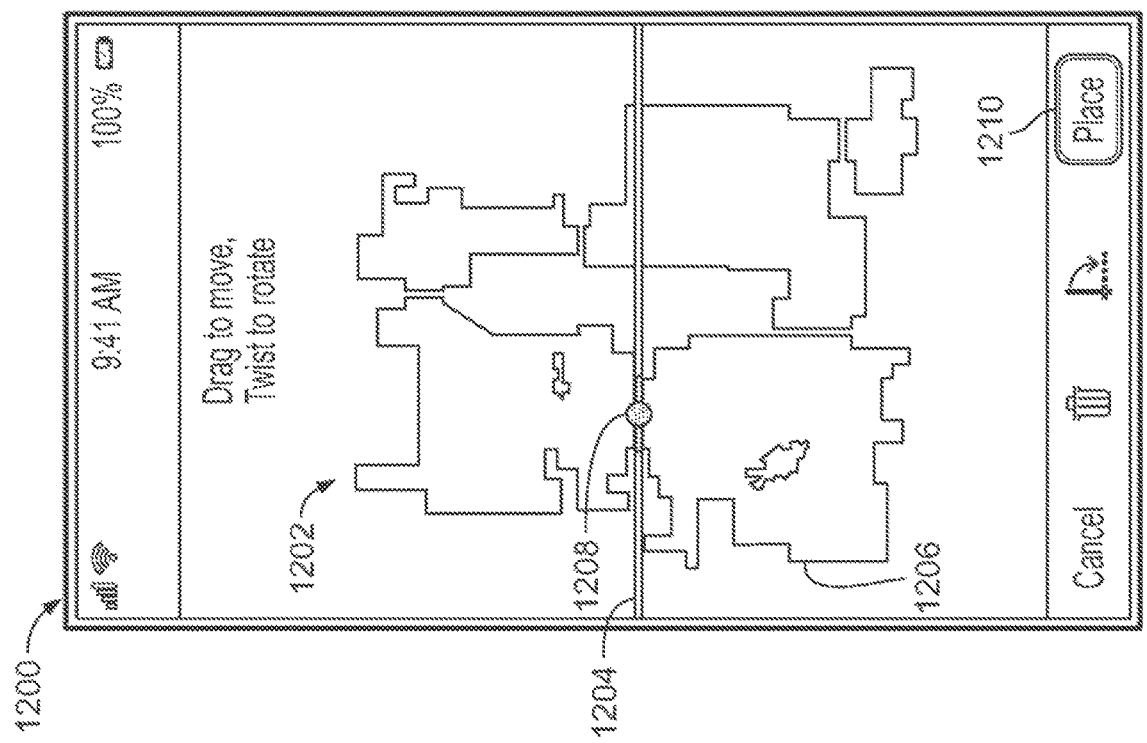
Figure 15:
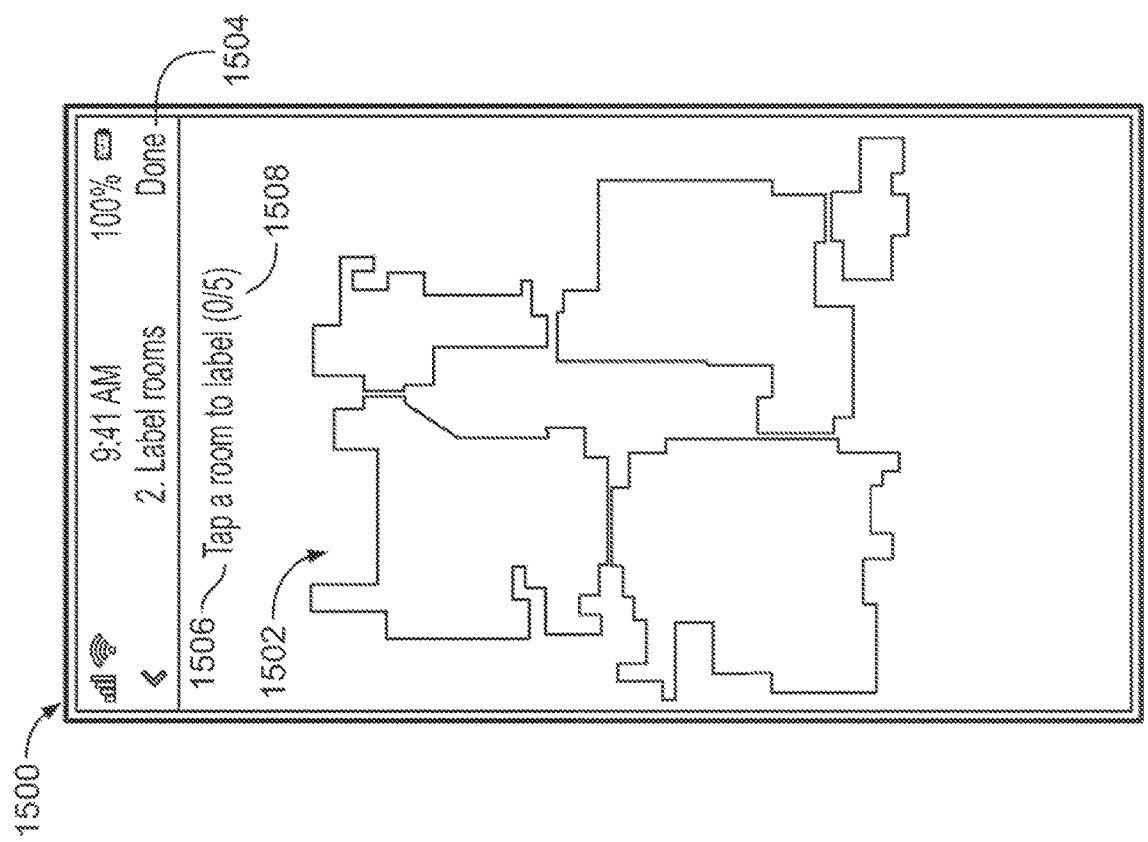

Similarly, in FIGS. 12 and 13, when a user determines from interface 1200 that a center point 1108 of a selectable graphical divider 1206 is properly placed on a map 1202 (another new representation of the map 402) in a room 1204 to divide the room 1204, the user presses a place button 1210. Upon pressing the place button 1210, an interface 1300 is presented, as shown in FIG. 13. The interface 1300 overlays a graphic 1304 over a map 1302 (the same as map 1202). The graphic 1304 indicates to the user that the position of the selectable graphical divider 1206 is being saved.

Figure 14:
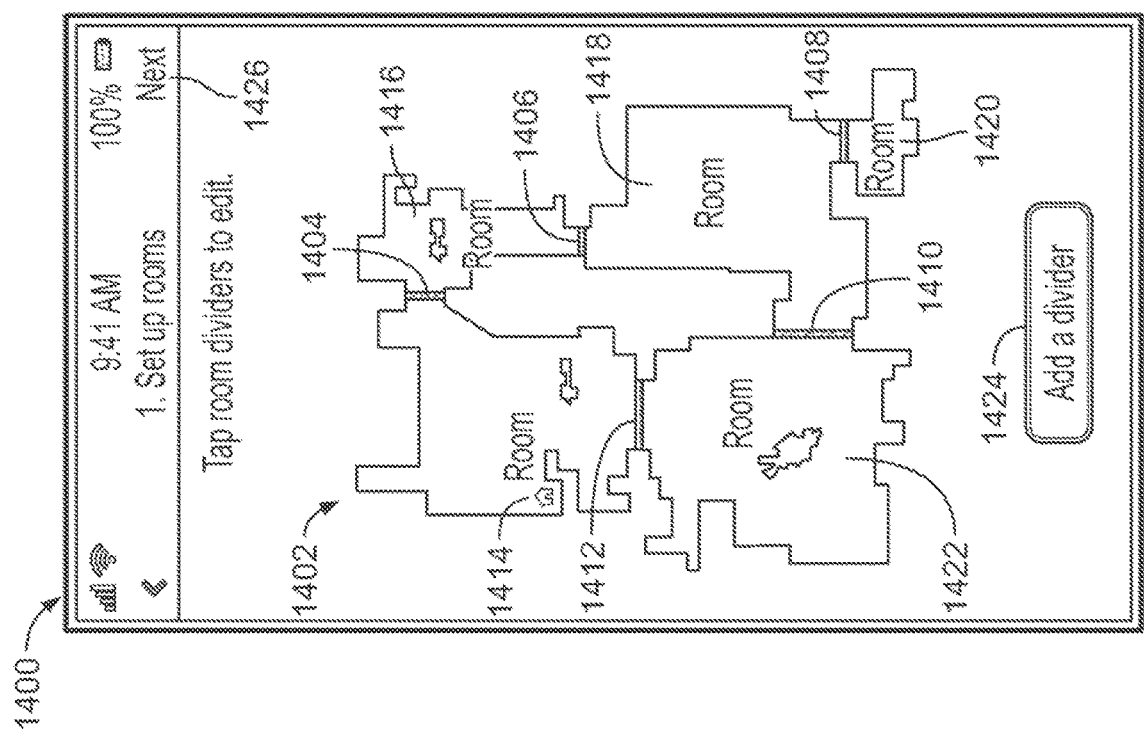

In FIG. 14, an interface 1400 presents a map 1402 (another new representation of the map 402) including rooms 1414, 1416, 1418, 1420, 1422 separated by selectable graphical dividers 1404, 1406, 1408, 1410, 1412. The interface 1400 also includes an add divider button 1424 to allow a user to create and add another selectable graphical divider to the map 1402. When the user has divided the map 1402 into rooms as desired, the user presses a next button 1426 to save the locations of the selectable graphical dividers 1404, 1406, 1408, 1410, 1412 on the map 1402.

When the room layout has been completed (i.e., all selectable graphical dividers have been placed and saved), individual rooms can be labelled. An interface 1500, shown in FIG. 15, includes an instruction message 1506 to the user to label a map 1502 (another new representation of the map 402). The instruction message 1506 includes a numerical indicator 1508 that shows a number of rooms on the map 1502 that are labelled compared to a total number of rooms on the map 1502. Here, the numerical indicator 1508 indicates that zero of the five rooms on the map 1502 are labelled. In some instances, the numerical indicator may include a percentage indicator, a single number showing a number of rooms labelled, etc. When all rooms are labelled, a user may select a done button 1504. When not all rooms are labelled, as in FIG. 15, the done button 1504 may be unselectable (e.g., greyed out).

Figures 16, 17:
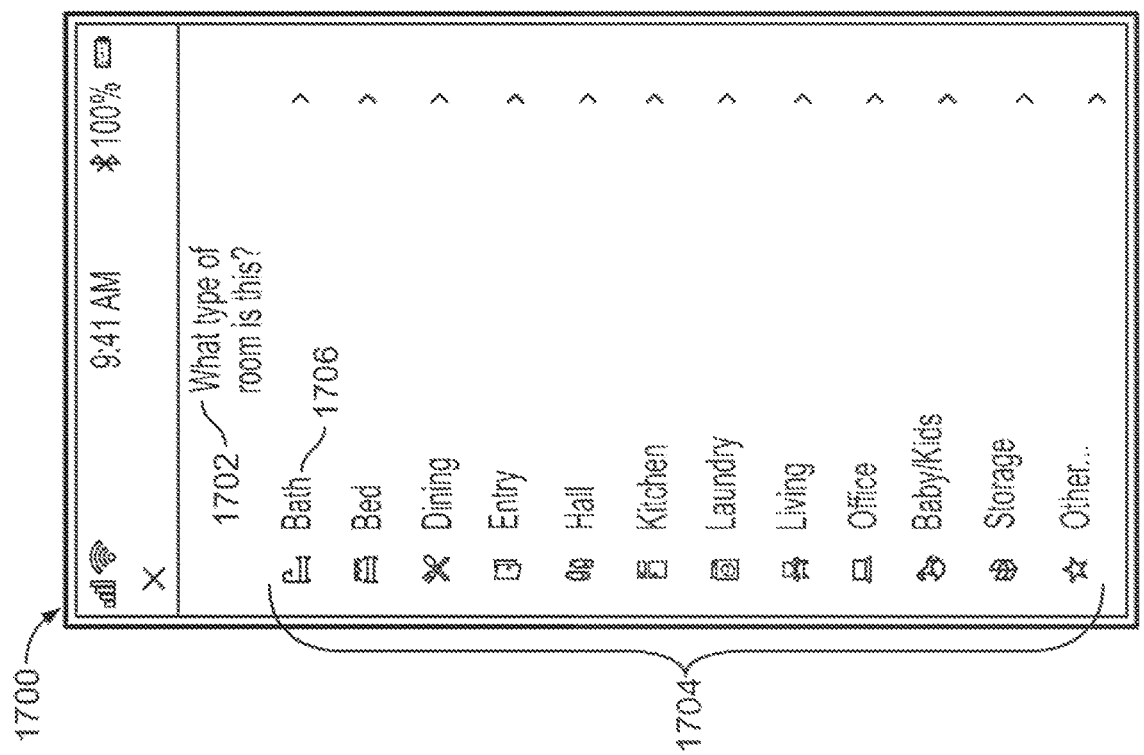
Figure 20:
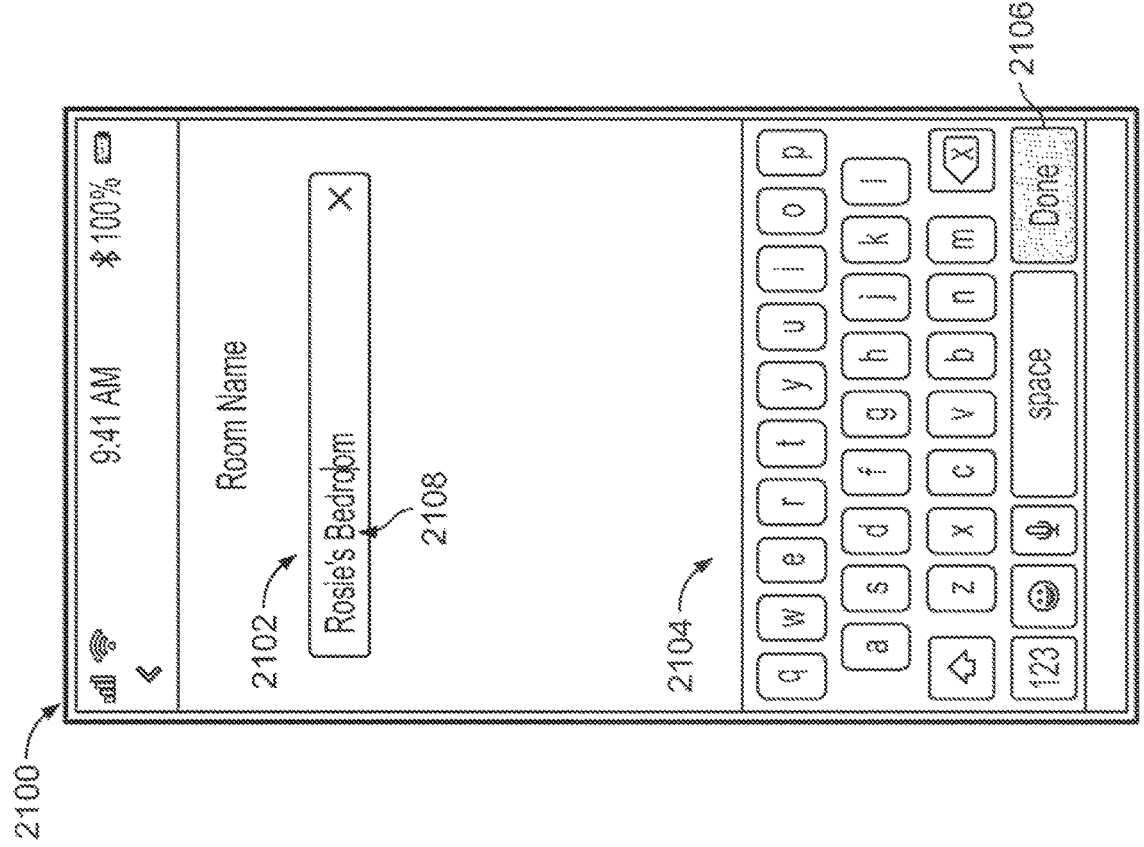

Referring to FIG. 16, on an interface 1600, when the user selects a room 1604, the room 1604 changes color and a text placeholder 1614 is positioned on the room 1604. On the interface 1600, the user selects a room name from a list 1606. The list 1606 includes labels, e.g., label 1608. After selecting a label from the list 1606, an interface 1700 is presented, as shown in FIG. 17, that shows a list 1704 of room type labels, e.g., room type label 1706. An instruction 1702 asks the user to select a room type label corresponding to a type of room that was labelled on interface 1600. The user may select a room type label 1706 to associate the room 1604 with a room type. Specific cleaning functions may be performed based on a type of room selected on interface 1700. For example, wet cleaning (e.g., mopping, etc.) may be performed in rooms identified as "Bathroom" or "Kitchen" type rooms where a hard floor surface likely exists. In another example, extra vacuum power may be used for cleaning in high traffic areas, e.g., "Hallway" or "Living Room" type rooms. Cleaning parameters (e.g., vacuum power, edge cleaning, spot cleaning, etc.) may be set within the mobile application 124 based on type of room. The set cleaning parameters may be applied to all rooms that are selected as being the same room type.

Referring to FIG. 18, after the user selects a label for the room 1604 from the list 1606 and room type, a room name label 1806 is applied to the room 1804 (a new representation of room 1604) on the map 1802 (a new representation of the map 402) in interface 1800. A numerical indicator 1808 (a new representation of numerical indicator 1508) presents a number of labelled rooms reflecting the room name label 1806 being included on the map 1802. As not all rooms on the map 1802 have been labelled, done button 1810 is unselectable (e.g., greyed out).

Referring to FIG. 19, on an interface 1900, the user selects a room 1904 on a map 1902 (another new representation of the map 402) to be labelled. When selected, the room 1904 changes color and a text placeholder 1906 is positioned on the room 1904. Instead of selecting from a list 1908 of room labels (e.g., label 1910), the user may select a custom label option 1912. Selecting the custom label option 1912 opens an interface 2000, shown in FIG. 20, on the display 122 of the mobile device 120. The interface 2000 includes a text box 2002 allowing the user to input a room name using keyboard 2006. The interface 2000 also includes a recommendation 2004 to use a unique, recognizable name as room names may not be repeated.

Figure 21:
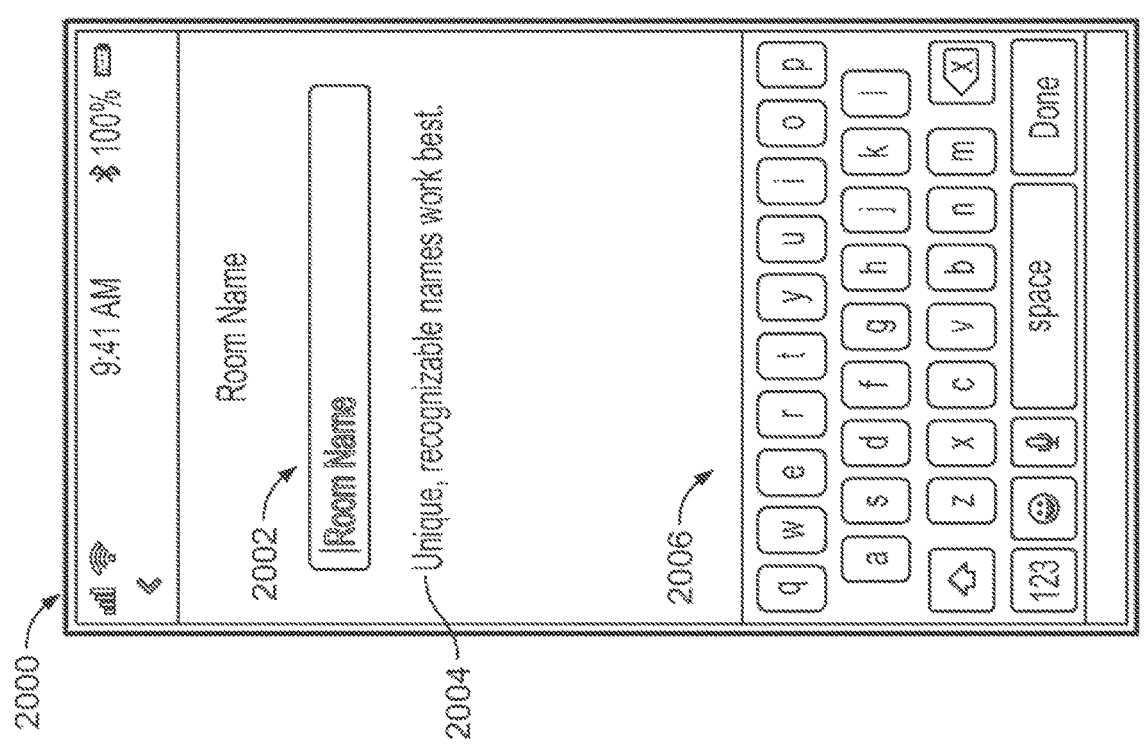

Referring to FIG. 21, the user has entered text 2108 into a text box 2102 using keyboard 2104 on interface 2100. As the text 2108 includes a unique name compared to other labels on the map 1902, a done button 2106 is selectable on the keyboard 2104 and allows the user to save the text 2108 as a room label for room 1904. Interface 2200 shown in FIG. 22, includes a label 2210 (corresponding to text 2108) on room 2208 (corresponding to room 1904). Any previously labelled rooms (e.g., room 2204 including label 2206) are shown on a map 2202. Additionally, a numerical indicator 2212 (a new representation of numerical indicator 1508) indicates that two out of five rooms on the map 2202 have been labeled.

Figure 23:
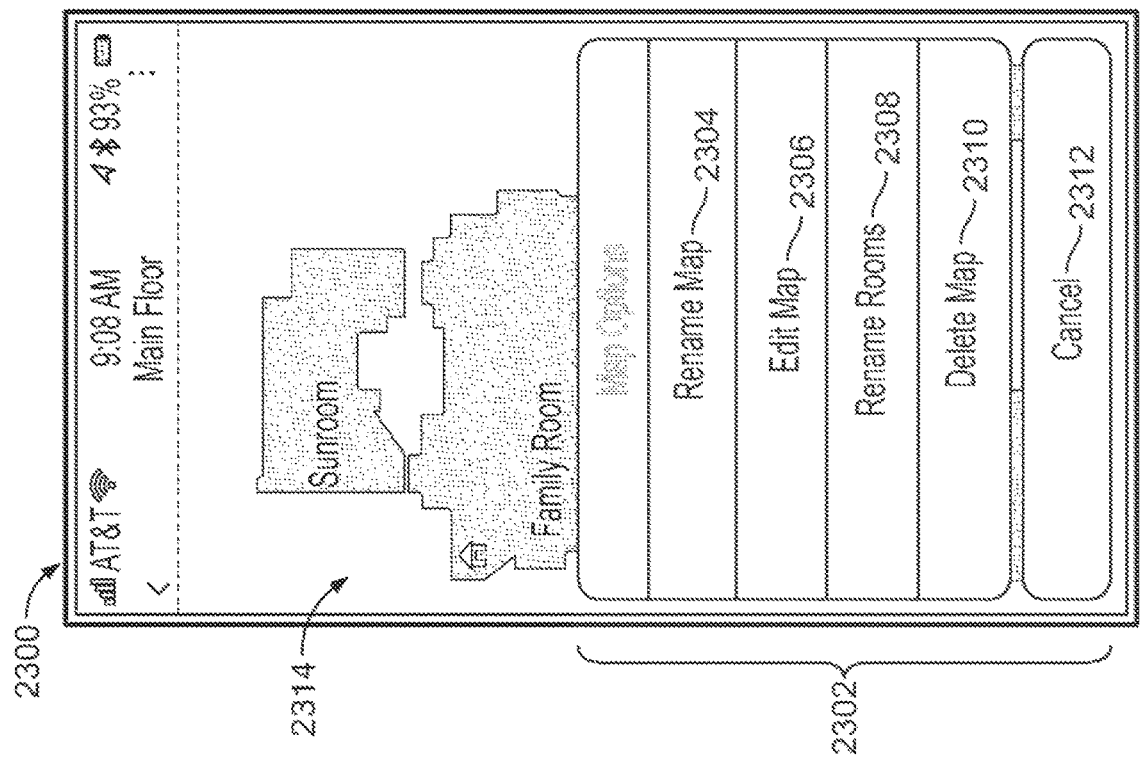
FIG. 23 is an interface showing map editing options.

Referring to FIG. 23, the user may access an interface 2300 by swiping up from the bottom of the display 122 on the mobile device 120, performing another triggering gesture on the display 122 of the mobile device 120, etc. The interface 2300 includes a menu 2302 that includes a list of map options for using with map 2314 (shown in the background of the interface 2300). The options include options to rename 2304 the map, edit 2306 the map, rename 2308 rooms on the map, delete 2310 the map or cancel 2312. Selecting the option to rename the map 2304 may bring up the interface 500 shown in FIG. 5 that allows the user to name the map 502. Selecting the option to edit 2306 the map may present the interface 800 allowing the user to change boundaries of the rooms 804, 806, 808, 810 on the map 802. The option to rename rooms 2308 on the map may bring up interfaces 1500, 1800, or 2200 that allow the user to select rooms to be labelled. The delete option will delete the map 2314 and the cancel option 2310 will close the menu 2302 and bring the user back to an interface showing the labelled rooms on the map 2314.

Figure 22:
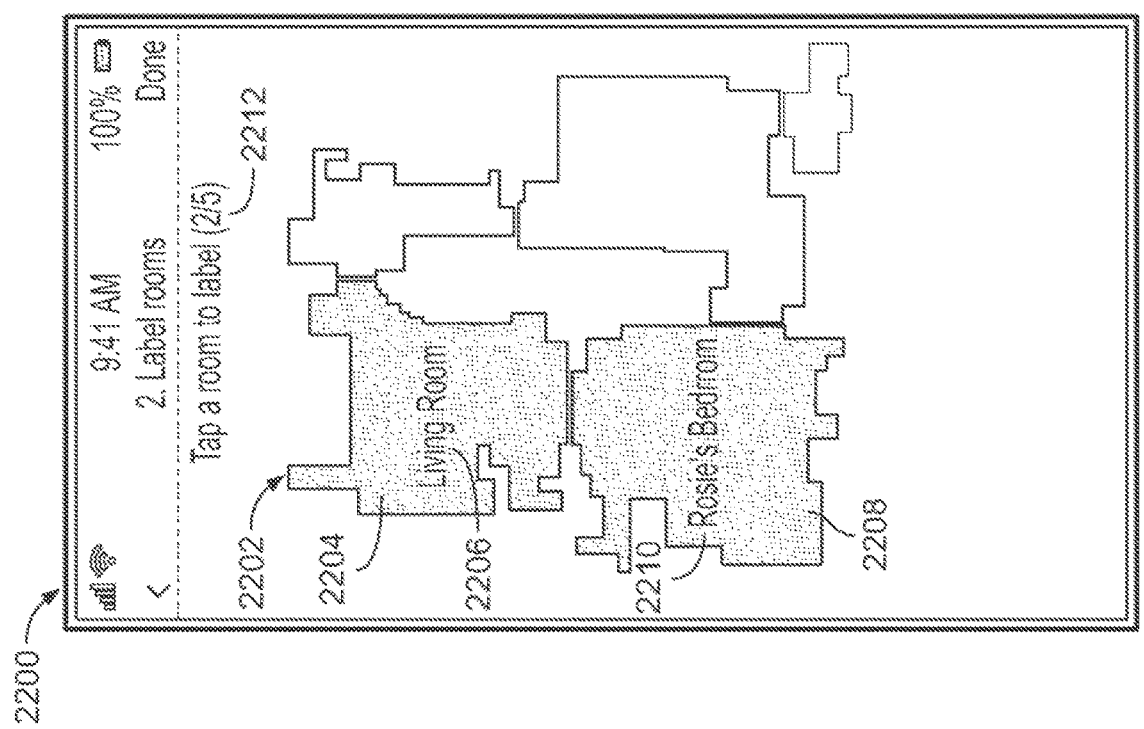

Referring to FIG. 24, interface 2400 shows a complete custom map 2402 that a user may save and use for instructing the autonomous cleaning robot 102 to perform cleaning operations. Numerical indicator 2424 indicates that all five rooms 2404, 2406, 2408, 2410, 2412 on the map 2402 are labelled with labels 2414, 2416, 2418, 2420, 2422, respectively. Done button 2426 is selectable (e.g., no longer greyed out as shown in FIGS. 18 and 22) and allows the user to save the custom map 2402. After the user selects the done button 2426, an interface 2500, as shown in FIG. 25 is presented.

Referring to FIG. 25, a graphic 2504 and a message 2502 indicate to the user that the user has completed customization of a map representing his/her space. The interface 2500 also presents options to clean a room 2506 and schedule room cleaning 2508. The option to clean a room 2506 may present, when selected, an interface that allows the user to select individual rooms from a list (where the rooms are listed with the text of the labels applied to the rooms on the map during customization). The option to schedule room cleaning 2508 may, when selected, present an interface that allows the user to schedule the autonomous cleaning robot to clean one or more of the labelled rooms at a desired time. For example, the user may select rooms from a list (where the rooms are listed with the text of the labels applied to the rooms on the map during customization) to clean during a cleaning mission that will be performed at a time when the user is not at home.

Figure 26:
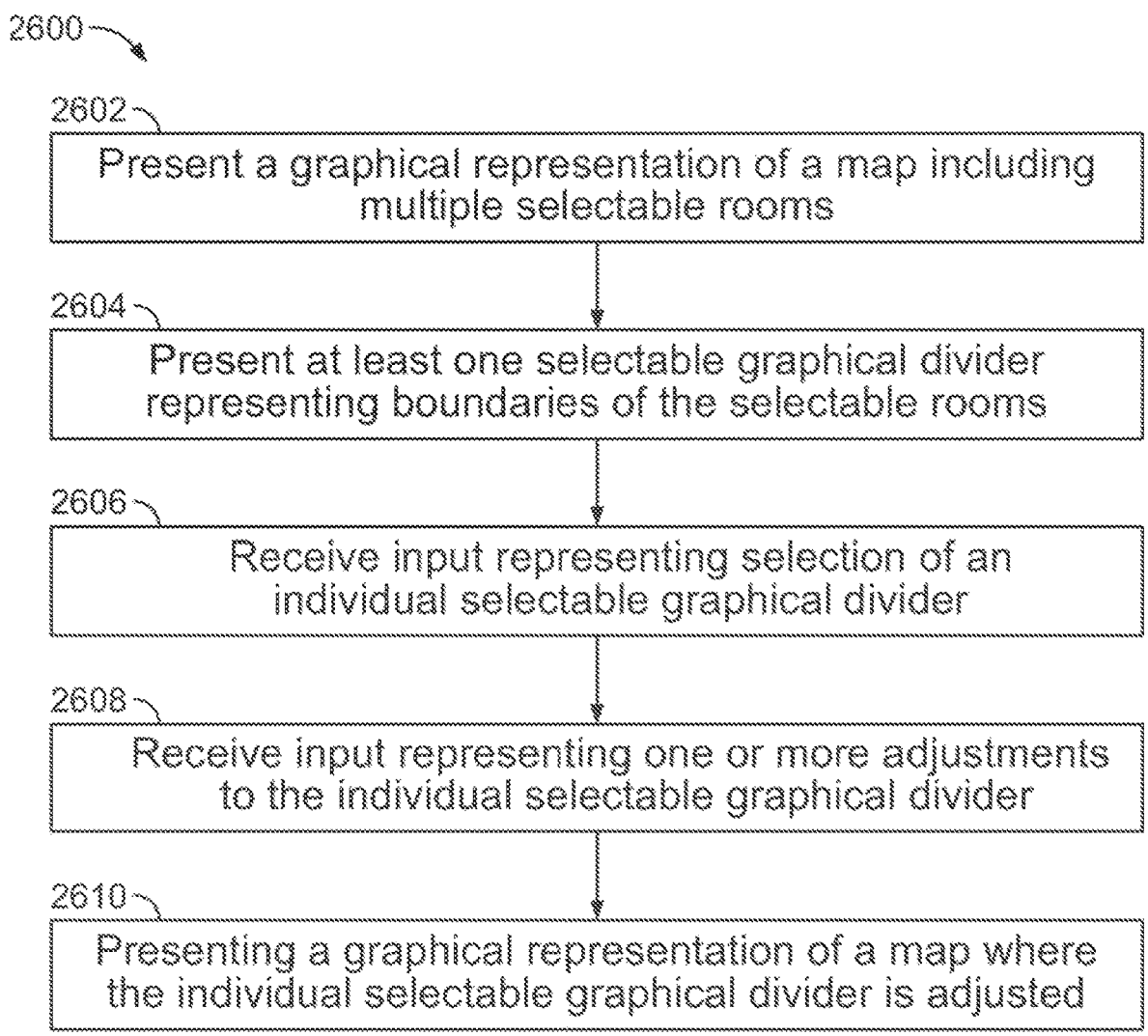
FIG. 26 is a flowchart representing a process for operating an autonomous cleaning robot.

Referring to FIG. 26, flow chart 2600 illustrates a process for controlling an autonomous cleaning robot 102. The process includes presenting (2602), on the display 122 of the mobile device 120, a graphical representation of a map including multiple selectable rooms. The process also includes presenting (2604), on the display 122 of the mobile device 120, at least one selectable graphical divider representing boundaries of the selectable rooms. The process also includes receiving (2606) input representing selection of an individual selectable graphical divider. The input may be received at one or more inputs (e.g., a touch screen display, a button, etc.) of the mobile device 120. The process also includes receiving (2608) input representing one or more adjustments to the individual selectable graphical divider. Adjustments may include moving, rotating, etc., the individual selectable graphical divider. The process also includes presenting (2610), on the display 122 of the mobile device 120, a graphical representation of a map where the individual selectable graphical divider is adjusted.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

Operations associated with implementing all or part of the robot operation and control described herein can be performed by one or more programmable processors executing one or more computer programs to perform the functions described herein. For example, the mobile device, a cloud computing system configured to communicate with the mobile device and the autonomous cleaning robot, and the robot's controller may all include processors programmed with computer programs for executing functions such as transmitting signals, computing estimates, or interpreting signals. A computer program can be written in any form of programming language, including compiled or interpreted languages, and it can be deployed in any form, including as a stand-alone program or as a module, component, subroutine, or other unit suitable for use in a computing environment.

The controllers and mobile devices described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The robot control and operating techniques described herein may be applicable to controlling other mobile robots aside from cleaning robots. For example, a lawn mowing robot or a space-monitoring robot may be trained to perform operations in specific portions of a lawn or space as described herein.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

What is claimed is:

1. A method of controlling operation an autonomous cleaning robot, the method comprising:
    receiving, from the autonomous cleaning robot, information about a floor surface traversable by the autonomous cleaning robot;
    presenting, by a display of a handheld computing device, a graphical map of the floor surface traversable by the autonomous cleaning robot using the received information;
    receiving, by the handheld computing device, a user selection of at least a portion of a boundary of a bounded area of the floor surface, the selected portion of the boundary representing a virtual boundary traversable by the autonomous cleaning robot;
    presenting, on the graphical map of the floor surface and in response to the user selection, (i) a graphical representation of the selected portion of the boundary of the bounded area of the floor surface, (ii) a first visual alert indicating the selected portion of the boundary is within the bounded area, and a second visual alert, visually different from the first visual alert, indicating the selected portion of the boundary is outside the bounded area, and (iii) an indicator associated with the bounded area of the floor surface; and
    generating a control signal for controlling the autonomous cleaning robot to clean one or more user-selectable bounded areas of the floor surface including the bounded area.

2. The method of claim 1, wherein:
    the bounded area is a first bounded area of the floor surface;
    the portion of the boundary of the first bounded area corresponds to a portion of a boundary of a second bounded area of the floor surface;
    the method further comprises:
    presenting, on the graphical map of the floor surface, an indicator associated with the second bounded area of the floor surface in response to the user selection; and
    the one or more user-selectable bounded areas comprises the second bounded area.

3. The method of claim 2,
    wherein the graphical representation of the selected portion of the boundary includes a graphical divider indicative of the portion of the boundary of the first bounded area and the portion of the boundary of the second bounded area.

4. The method of claim 3, wherein the graphical divider comprises a portion corresponding to the graphical representation of the selected portion of the boundary.

5. The method of claim 4, wherein:
    the portion of the graphical divider is a first portion, and
    the graphical divider comprises a second portion extending beyond a representation of the boundary of the first bounded area and extending beyond a representation of the boundary of the second bounded area.

6. The method of claim 3, wherein:
    the graphical divider is a user-selectable graphical divider; and
    presenting the user-selectable graphical divider comprises presenting the user-selectable graphical divider in response to the user selection.

7. The method of claim 6, wherein:
    the user selection comprises one or more user inputs comprising one or more adjustments of the user-selectable graphical divider, the one or more adjustments causing a representation of relative movement of the user-selectable graphical divider and the graphical map.

8. The method of claim 7, wherein:
    wherein the representation of relative movement of the user-selectable graphical divider and the graphical map corresponds to a representation of relative rotation of the user-selectable graphical divider and the graphical map.

9. The method of claim 7, wherein:
    presenting the user-selectable graphical divider comprises presenting a graphical reference point fixed on the user-selectable graphical divider, and
    the one or more adjustments causes a representation of relative movement of the graphical reference point and the graphical map.

10. The method of claim 9,
    wherein the first visual alert is represented by a first shape of the graphical reference point, wherein the second visual alert is represented by a second shape, different from the first shape, of the graphical reference point.

11. The method of claim 9, wherein:
    the graphical reference point corresponds to a graphical center point of the user-selectable graphical divider.

12. The method of claim 9, wherein:
    the representation of relative movement of the user-selectable graphical divider and the graphical map corresponds to a representation of rotation of the user-selectable graphical divider about the graphical reference point.

13. The method of claim 2, wherein:
    the graphical representation of the selected portion of the boundary is a first graphical boundary indicator,
    the portion of the boundary of the first bounded area of the floor surface is a first portion of the boundary of the first bounded area of the floor surface,
    the user selection of at least the first portion of the boundary of the bounded area of the floor surface is a first user selection, and
    the method further comprises:
    receiving, by the handheld computing device, a second user selection of at least a portion of a second portion of the first bounded area of the floor surface, and
    presenting, on the graphical map of the floor surface and in response to the second user selection, a second graphical representation of the second portion of the boundary of the first bounded area.

14. The method of claim 13, wherein:
    the method further comprises:
    presenting, on the graphical map of the floor surface and in response to the second user selection, an indicator associated with a third bounded area;

the second portion of the boundary of the first bounded area corresponds to a portion of a boundary of the third bounded area on the floor surface; and the one or more user-selectable bounded areas comprises the third bounded area.

15. The method of claim 1, wherein:
the indicator associated with the bounded area corresponds to a label for the bounded area.

16. The method of claim 1, wherein:
presenting the graphical map of the floor surface comprises:
presenting the graphical map of the floor surface based on data collected by the autonomous cleaning robot.

17. The method of claim 16, wherein:
the portion of the boundary of the bounded area corresponds to a first portion of the boundary of the bounded area; and
presenting the graphical map of the floor surface traversable by the autonomous cleaning robot comprises:
presenting a second portion of the boundary of the bounded area different from the first portion of the boundary of the bounded area.

18. The method of claim 17, wherein:
the second portion of the boundary of the bounded area is defined by the data collected by the autonomous cleaning robot; and
an end point of the first portion of the boundary of the bounded area is defined by the data collected by the autonomous cleaning robot.

19. The method of claim 1, wherein:
the user selection of at least the portion of the boundary of the bounded area on the floor surface corresponds to a user selection of only a single side of the boundary of the bounded area.

20. A handheld computing device for controlling operation of an autonomous cleaning robot, the handheld computing device comprising:
a user input device;
a display; and
one or more processing devices configured to execute instructions to control operations comprising:
receiving, from the autonomous cleaning robot, information about a floor surface traversable by the autonomous cleaning robot;
presenting, by the display, a graphical map of the floor surface traversable by the autonomous cleaning robot using the received information;
receiving, by the user input device, a user selection of at least a portion of a boundary of a bounded area of the floor surface, the selected portion of the boundary representing a virtual boundary traversable by the autonomous cleaning robot;
presenting, on the graphical map of the floor surface and in response to the user selection, (i) a graphical representation of the selected portion of the boundary of the bounded area of the floor surface, (ii) a first visual alert indicating the selected portion of the boundary is within the bounded area, and a second visual alert, visually different from the first visual alert, indicating the selected portion of the boundary is outside the bounded area, and (iii) an indicator associated with the bounded area of the floor surface; and
generating a control signal for controlling the autonomous cleaning robot to clean one or more user-selectable bounded areas of the floor surface including the bounded area.

21. The handheld computing device of claim 20, wherein:
the bounded area is a first bounded area of the floor surface;
the portion of the boundary of the first bounded area corresponds to a portion of a boundary of a second bounded area of the floor surface;
the operations further comprise:
presenting, on the graphical map of the floor surface, an indicator associated with the second bounded area of the floor surface in response to the user selection, and
presenting, on the graphical map of the floor surface, the graphical representation of the selected portion of the boundary including a graphical divider indicative of the portion of the boundary of the first bounded area and the portion of the boundary of the second bounded area; and
the one or more user-selectable bounded areas comprises the second bounded area.

22. The handheld computing device of claim 21, wherein:
the graphical divider is a user-selectable graphical divider; and
presenting the user-selectable graphical divider comprises presenting the user-selectable graphical divider in response to the user selection.

23. The handheld computing device of claim 22, wherein:
the user selection comprises one or more user inputs comprising one or more adjustments of the user-selectable graphical divider, the one or more adjustments causing a representation of relative movement of the user-selectable graphical divider and the graphical map.

24. The handheld computing device of claim 22, wherein the first visual alert is represented by a first shape of a graphical reference point fixed to the user-selectable graphical divider is on the graphical map, wherein the second visual alert is represented by a second shape, different from the first shape, of the graphical reference point.

25. One or more non-transitory machine-readable storage media storing instructions that are executable on one or more processing devices to perform operations comprising:
presenting, by a display of a handheld computing device, a graphical map of a floor surface traversable by an autonomous cleaning robot;
receiving, by the handheld computing device, a user selection of at least a portion of a boundary of a bounded area of the floor surface, the selected portion of the boundary representing a virtual boundary traversable by the autonomous cleaning robot;
presenting, on the graphical map of the floor surface and in response to the user selection, (i) a graphical representation of the selected portion of the boundary of the bounded area of the floor surface, (ii) a first visual alert indicating the selected portion of the boundary is within the bounded area, and a second visual alert, visually different from the first visual alert, indicating the selected portion of the boundary is outside the bounded area, and (iii) an indicator associated with the bounded area of the floor surface; and
providing data indicative of one or more user-selectable bounded areas of the floor surface to control a cleaning operation of the autonomous cleaning robot, and the one or more user-selectable bounded areas comprising the bounded area.

26. The one or more non-transitory machine-readable storage media of claim 25, wherein:
the bounded area is a first bounded area of the floor surface;

the portion of the boundary of the first bounded area corresponds to a portion of a boundary of a second bounded area of the floor surface;

the operations further comprise:

presenting, on the graphical map of the floor surface, an indicator associated with the second bounded area of the floor surface in response to the user selection, and presenting, on the graphical map of the floor surface, the graphical representation of the selected portion of the boundary including a graphical divider indicative of the portion of the boundary of the first bounded area and the portion of the boundary of the second bounded area; and the one or more user-selectable bounded areas comprises the second bounded area.

27. The one or more non-transitory machine-readable storage media of claim 26, wherein:

the graphical divider is a user-selectable graphical divider; and presenting the user-selectable graphical divider comprises presenting the user-selectable graphical divider in response to the user selection.

28. The one or more non-transitory machine-readable storage media of claim 27, wherein:

the user selection comprises one or more user inputs comprising one or more adjustments of the user-selectable graphical divider, the one or more adjustments causing a representation of relative movement of the user-selectable graphical divider and the graphical map.

29. The one or more non-transitory machine-readable storage media of claim 27, wherein the first visual alert is represented by a first shape of a graphical reference point fixed to the user-selectable graphical divider, wherein the second visual alert is represented by a second shape, different from the first shape, of the graphical reference point.

* * * * *